(12) United States Patent
Wang

(10) Patent No.: US 9,921,425 B2
(45) Date of Patent: Mar. 20, 2018

(54) SWITCHABLE PROJECTION PANEL

(71) Applicant: Jiansheng Wang, Plano, TX (US)

(72) Inventor: Jiansheng Wang, Plano, TX (US)

( * ) Notice: Subject to any disclaimer, the term of this patent is extended or adjusted under 35 U.S.C. 154(b) by 534 days.

(21) Appl. No.: 14/204,642

(22) Filed: Mar. 11, 2014

(65) Prior Publication Data
US 2014/0300830 A1 Oct. 9, 2014

Related U.S. Application Data

(60) Provisional application No. 61/808,960, filed on Apr. 5, 2013, provisional application No. 61/831,028, filed on Jun. 4, 2013, provisional application No. 61/824,420, filed on May 17, 2013.

(51) Int. Cl.
| | |
|---|---|
| *G02F 1/1339* | (2006.01) |
| *G02F 1/1334* | (2006.01) |
| *G03B 21/60* | (2014.01) |
| *G02F 1/1335* | (2006.01) |

(52) U.S. Cl.
CPC ......... *G02F 1/1334* (2013.01); *G02F 1/1339* (2013.01); *G02F 1/13392* (2013.01); *G03B 21/60* (2013.01); *G02F 1/133504* (2013.01); *G02F 2001/13345* (2013.01)

(58) Field of Classification Search
CPC ............... G02F 1/1334; G02F 1/13342; G02F 2001/13345
See application file for complete search history.

(56) References Cited

U.S. PATENT DOCUMENTS

| | | | | |
|---|---|---|---|---|
| 5,270,843 A | * | 12/1993 | Wang ................... | C09K 19/544 349/90 |
| 2003/0151354 A1 | * | 8/2003 | Takizawa .......... | G02F 1/133553 313/498 |
| 2012/0002142 A1 | * | 1/2012 | Asaoka ............. | G02F 1/133512 349/86 |

* cited by examiner

*Primary Examiner* — Phu Vu
(74) *Attorney, Agent, or Firm* — Paul D. Lein, Esq.; Locke Lord LLP

(57) ABSTRACT

A panel apparatus comprises a first layer. The first layer includes a liquid crystal microdroplet display (LCMD) switchable between transparent and opaque states in response to a change in an applied electrical voltage. The panel apparatus further comprises a second layer spaced apart from and coupled to the first layer. The second layer includes a transparent panel.

20 Claims, 16 Drawing Sheets

SWITCHABLE PROJECTION PANEL

CROSS-REFERENCE TO RELATED APPLICATIONS

This application claims the benefit of U.S. Provisional Application 61/808,960 filed Apr. 5, 2013; U.S. Provisional Application 61/824,420 filed May 17, 2013; and U.S. Provisional Application 61/831,028 filed Jun. 4, 2013, which are all incorporated by reference herein in their entirety.

FIELD

The present disclosure is directed toward layered panel systems and methods of use, and more particularly to systems and methods for projection panels using liquid crystal microdroplet (LCMD) devices.

BACKGROUND

Continued advancements in the field of optoelectronics have led to the development of liquid crystal microdroplet (LCMD) displays. In this type of display, liquid crystal (LC) material is contained in microdroplets embedded in a solid polymer matrix. Birefringence results from a material having a different index of refraction in different directions. The extraordinary index of refraction ($n_e$) of a liquid crystal molecule is defined as that measured along the long axis of the molecule, and the ordinary index of refraction ($n_o$) is measured in a plane perpendicular to the long axis. The dielectric anisotropy of liquid crystals is defined as $\Delta\in=\in_{\parallel}-\in_{\perp}$, where $\in_{\parallel}$ and $\in_{\perp}$ are parallel and perpendicular dielectric constants, respectively. Liquid crystals having a positive dielectric anisotropy ($\Delta\in>0$) are called positive-type liquid crystals, or positive liquid crystals, and liquid crystals having a negative dielectric anisotropy ($\Delta\in<0$) are called negative-type liquid crystals, or negative liquid crystals. The positive liquid crystals orient in the direction of an electric field, whereas the negative liquid crystals orient perpendicular to an electric field. These electro-optical properties of liquid crystals have been widely used in various applications.

One approach to obtaining dispersed microdroplets in a polymer matrix is the method of encapsulating or emulsifying the liquid crystals and suspending the liquid crystals in a film which is polymerized. This approach is described, for example, in U.S. Pat. Nos. 4,435,047; 4,605,284; and 4,707,080. This process includes mixing positive liquid crystals and encapsulating material, in which the liquid crystals are insoluble, and permitting formation of discrete capsules containing the liquid crystals. The emulsion is cast on a substrate, which is precoated with a transparent electrode, such as an indium tin oxide (ITO) coating, to form an encapsulated liquid crystal device.

LCMD displays may also be formed by phase separation of low-molecular weight liquid crystals from a prepolymer or polymer solution to form microdroplets of liquid crystals. This process, described in U.S. Pat. Nos. 4,685,771 and 4,688,900, includes dissolving positive liquid crystals in an uncured resin and then sandwiching the mixture between two substrates which are precoated with transparent electrodes. The resin is then cured so that microdroplets of liquid crystals are formed and uniformly dispersed in the cured resin to form a polymer dispersed liquid crystal device. When an AC voltage is applied between the two transparent electrodes, the positive liquid crystals in microdroplets are oriented and the display is transparent if the refractive index of the polymer matrix ($n_p$) is made to equal the ordinary index of liquid crystals ($n_o$). The display scatters light in the absence of the electric field, because the directors (vector in the direction of the long axis of the molecules) of the liquid crystals are random and the refractive index of the polymer cannot match the index of the liquid crystals. Nematic liquid crystals having a positive dielectric anisotropy ($\Delta\in>0$), large $\Delta n$, which may contain a dichroic dye mixture, can be used to form a transparent and absorbing mode.

LCMD displays may be characterized as normal mode or reverse mode displays. A normal mode display containing liquid crystals is non-transparent (scattering or absorbing) in the absence of an electric field and is transparent in the presence of an applied electric field. A reverse mode display is transparent in the absence of an electric field and is non-transparent (scattering or absorbing) in the presence of an applied electric field.

If an electric field is applied on a LCMD display, liquid crystals in microdroplets are not entirely perpendicular to the substrate. The central part of liquid crystals in the droplets is clear if the refractive index of the polymer matches the ordinary refractive index of the liquid crystals ($n_o$). However, liquid crystals near the ends of the microdroplet are strongly bent because they are parallel to the skin of the inner layer. They are, therefore, tilted to the substrate surface, and the refractive index of the liquid crystals cannot match with the refractive indexes of the polymer matrix and inner layer. Therefore, parts of the liquid crystal droplets scatter light and produce haze.

There exists a need for devices that use improved LCMD technologies in projection systems that provide improved diffusion and provide for a wide viewing angle. These functions may be achieved with an improved scattering mechanism using, for example, a non-linear optical matrix system.

SUMMARY

The embodiments of the invention are summarized by the claims that follow the description.

In one embodiment, a panel apparatus comprises a first layer. The first layer includes a liquid crystal microdroplet (LCMD) display switchable between transparent and opaque states in response to a change in an applied electrical voltage. The panel apparatus further comprises a second layer spaced apart from and coupled to the first layer. The second layer includes a transparent panel.

In another embodiment, a film apparatus comprises a first layer. The first layer includes a liquid crystal microdroplet (LCMD) display switchable between transparent and opaque states in response to a change in an applied electrical voltage. The film apparatus also includes a second layer coupled to the first layer. The second layer includes a light reflective coating.

Additional aspects, features, and advantages of the present disclosure will become apparent from the following detailed description

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

FIG. 11b is a perspective view of the switchable projection billboard of FIG. 11a.

FIG. 12b is a perspective view of the switchable projection billboard of FIG. 12a.

FIG. 14b is a cross-sectional view of a prism element of the projection changeable billboard of FIG. 14a.

DETAILED DESCRIPTION

Figure 1:
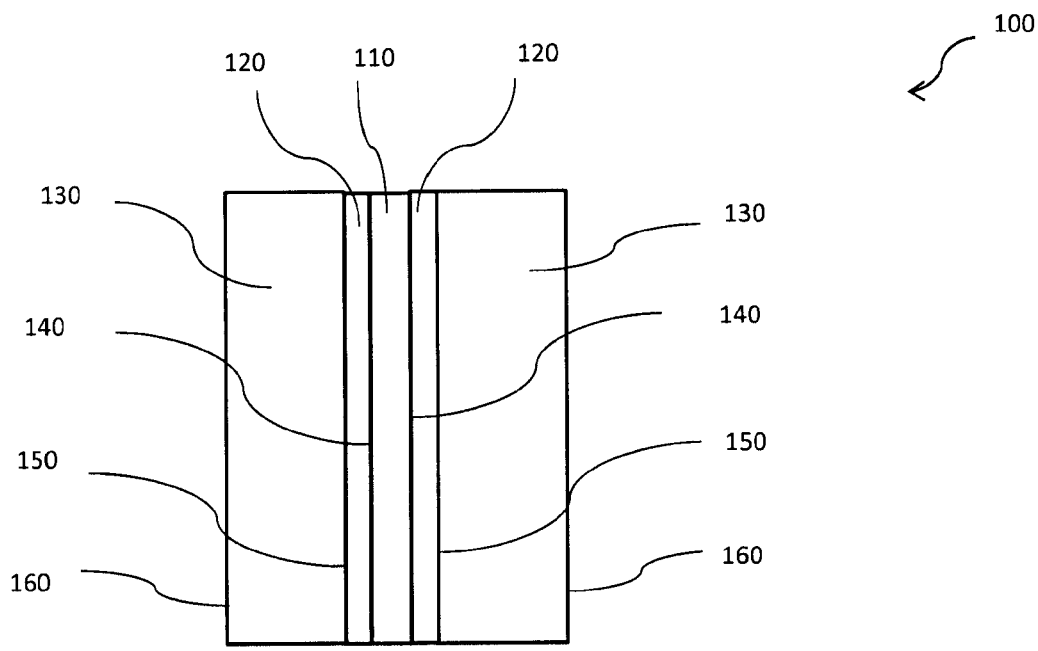
FIG. 1 is a cross-sectional view of an LCMD film structure according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein the term "LCMD device" or "LCMD film" or "LCMD display" means a device or film or display, respectively, formed using various classes of polymer films. For example, and LCMD device may be formed using nematic curvilinear aligned phase (NCAP) films, such as material and devices described in U.S. Pat. No. 4,435,047 filed Sep. 16, 1981 disclosing "Encapsulated Liquid Crystal and Method," which is incorporated by reference herein in its entirety. An LCMD device may also be formed using polymer dispersed liquid crystal (PDLC) films formed using phase separation in a homogenous polymer matrix, such as material and devices described in U.S. Pat. No. 4,688,900 filed Sep. 17, 1985 disclosing "Light Modulating Material Comprising a Liquid Crystal Dispersion in a Plastic Matrix," which is incorporated by reference herein in its entirety. An LCMD device may also be formed using a non-homogenous polymer dispersed liquid crystal display (NPD-LCD) formed using a non-homogenous light transmissive copolymer matrix with dispersed droplets of liquid crystal material, such as material and devices described in U.S. Pat. No. 5,270,843 filed Aug. 31, 1992 disclosing "Directly Formed Polymer Dispersed Liquid Crystal Light Shutter Displays," which is incorporated by reference herein in its entirety. Other forms of liquid crystal microdroplet films may also be suitable. A NPD-LCD device may be configured in one of two modes. In a positive mode, an NPD-LCD device is switchable between an opaque state without an applied electrical voltage and clear state with an applied electrical voltage. In a negative mode, an NPD-LCD device is switchable between a clear state without an applied electrical voltage and an opaque state with an applied electrical voltage.

Switchable Projection Panel

As used herein, the terms "switchable projection panel," "layered switchable panel," or "layered projection panel" means a device or panel component formed of at least one layer of a transparent material such as glass or a polymer material together with at least one LCMD film layer. As used herein, the term "glass" is understood to include traditional silica-based glass as well as polymer-based transparent materials, such as acrylic glass and polycarbonate, that have a relatively rigid planar format. Glass may be colored or include tinting. Glass may also include reinforced, toughened and laminated glasses or any other type of transparent glass having higher strength, safety or other special features.

Referring to FIG. 1, a cross-sectional view of one example of an LCMD film structure 10 is illustrated. LCMD film structure 100 includes a LC-polymer (matrix) layer 110, a transparent and conductive coating 120 (e.g., an indium tin oxide (ITO) coating) and a transparent plastic film 130. There are three layer interfaces. An interface 140 between LC-polymer matrix 110 and ITO 120 and an interface 150 between ITO 120 and film 130 are solid-solid interfaces. A film surface 160 is air-solid interface. Note that in alternative embodiments, the film surface may have a liquid-solid interface (e.g., if the structure is submerged in a liquid) or another gas-solid interface. A light passing through a liquid-solid interface behaves similarly to light passing through a solid-solid interface because the reflective indexes are similar. Gas has a smaller reflective index than liquids or solids.

Figure 2:
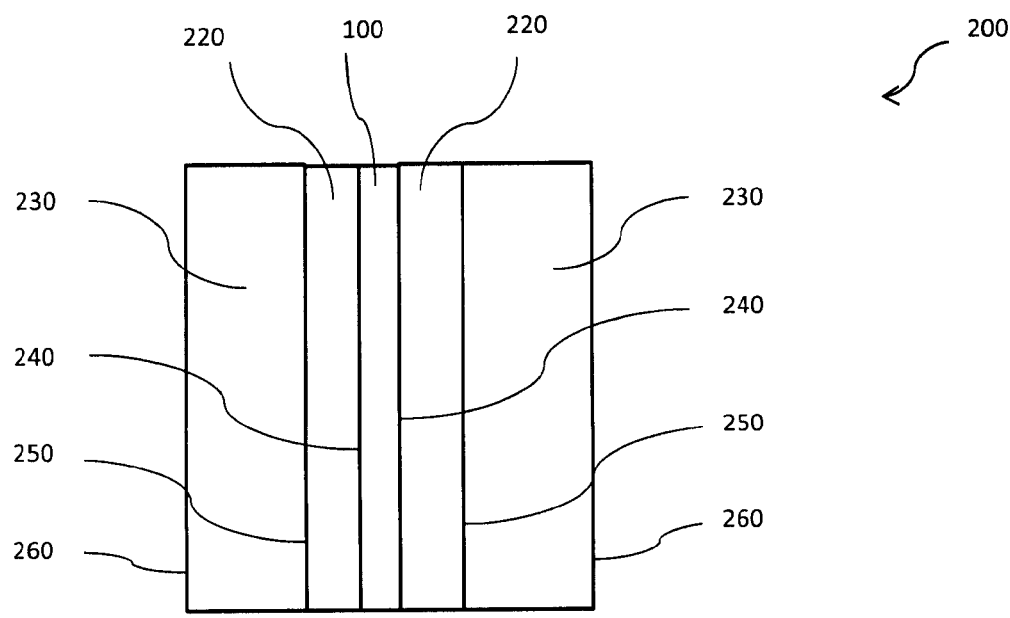
FIG. 2 is a cross-sectional view of a laminated LCMD panel according to an embodiment of the present disclosure.

FIG. 2 is a cross-sectional view of a laminated LCMD panel 200. The LCMD film structure 100 is laminated between two layers of glass 230 with an adhesive interlayer 220. The interlayer material may include, for example, polyvinyl butyral (PVB), ethylene vinyl acetate (EVA), and/or thermoplastic polyurethane (TPU). An interface 240 between LCMD film structure 100 and the interlayer 220 and an interface 250 between the interlayer 220 and the glass 230 are solid-solid interfaces. A glass surface 260 is air-solid interface. Note that in alternative embodiments, the glass surface may have a liquid-solid interface (e.g., if the structure is submerged in a liquid) or another gas-solid interface. As used herein, the term "laminated" refers to layered structures in which the LCMD film and one or more layers of glass are separated by an adhesive interlayer extending across substantially the entire interface between the LCMD film and the glass.

Figure 3:
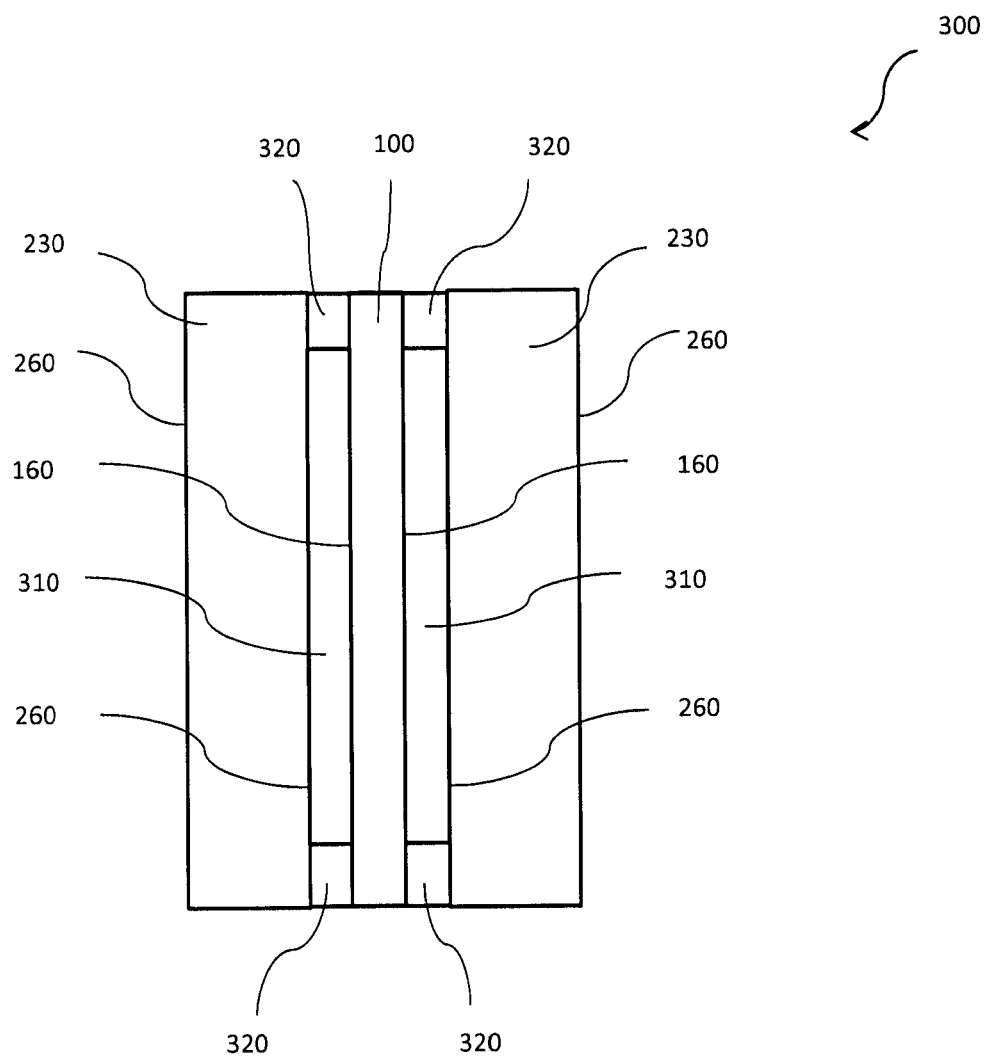
FIG. 3 is a cross-sectional view of a panel apparatus according to one or more embodiments of the present disclosure.

FIG. 3 is a cross-sectional view of a panel apparatus 300. The apparatus 300 includes the layered LCMD film 100 positioned between two layers of glass 230. A seal 320 extends around a perimeter between the glass 230 and the LCMD film 100. The seal 320 traps or sandwiches an air layer 310 between the LCMD film 100 and the glass 230. Thus, interface 250 between the glass and the air layer 310 is solid-air interface, and the interface 160 between the LCMD film and the air layer 310 is a solid-air interface. However, other configurations and inclusion or omission of the apparatus 300 may be possible. The terms "sandwiching" and "air-sandwiching" are understood to include creating a gap for or trapping air or another gaseous material (with optical properties similar to air) between the glass and the LCMD film. For example, the use of an inert gas, such as argon gas, as a trapped gaseous material may allow the panel to resist heat and thus provide energy savings. In various alternative embodiments, an air-tight seal is not required between the LCMD film 100 and the glass 230. Rather, any form of spacing component that produces a gap and provides a bond between the LCMD film 100 and the glass 230 may be used. In this embodiment, air-flow through the gap permitted.

The panel apparatus 300 is an example embodiment and is not intended to limit the present invention beyond what is explicitly recited in the claims. For example in various embodiments, spacers 610 (See, FIG. 6) may be added into air layer 310 to provide a flatness or rigidity to the panel. The perimeter size of the LCMD film 100 may be smaller than the perimeter size of the glass 230, so that the edge seal may cover the edge of the LCMD film 100 to enhance bonding between the two layers of glass.

The edge seal 320 may have sufficient strength and rigidity to maintain the film and glass in the spaced apart relationship as the panel apparatus 300 is transported, for example, by way of a suction cup tool attached to one of the two layers of glass. Suitable edge seal materials may include extreme adhesion tapes, liquid adhesives, or gelatinous adhesives. The adhesive may be applied with patterning delivery system. After assembling the apparatus 300, the adhesive or other sealant material may be cured with various of methods such as by using heat, UV, catalyst or additional time. Either or both of the film 100 and the glass layers 230 may also have anti-reflective coating or anti-glare coatings.

Light energy traveling through the air-solid interface 160 in apparatus 300 behaves differently from light energy traveling through the solid-solid interface 240 in apparatus 200. These interfaces have important optical function and greatly affect image quality of projection.

The laminated LCMD glass panel 200 is much more durable than LCMD film. Although laminated LCMD glass panels have been used as switchable privacy glass for many years, they are unsuitable for image projection, because projected images on laminated LCMD glass panels appear very blurry. Older generations of LCMD films, such as NCAP and PDLC films, are not suitable for projection because projected images are not bright and clear enough on these films. Low level of scattering and serious asymmetrical scattering (oval effect) render these types of LCMD films unsuitable for projection. Poor stability of the older generation of LCMD film is another reason that these types of older LCMD films are unsuitable for projection. First generation LCMD film, i.e. NCAP film, is made of a water soluble polymer such as polyvinyl alcohol with constant reflective index and is very hydroscopic. NCAP film must be laminated (i.e., with a full interlayer) onto glass to prevent moisture for its main application as switchable privacy glass. Second generation of LCMD films, i.e., PDLC films, made of a regular polymer such as epoxy with constant reflective index is also sensitive to moisture because of unbalanced chemical ratios caused for matching reflective index between liquid crystal and the polymer. Therefore, the older generations of LCMD films are mainly used in form of laminated glass for many years. These issues with image quality and stability have prevented the adoption of laminated LCMD film panels for use in projection.

The third generation of LCMD films, NPD-LCD films made of non-linear polymer with gradually changed reflective index, are very stable in air, are water proof, and provide a high quality projection image. Many applications of NPD-LCD film do not require lamination for moisture protection. However, laminated NPD-LCD glass panels also generate blurred images and are not entirely suitable for projection. Image quality on laminated LCMD glass panels is generally inferior to image quality on corresponding LCMD film alone for either front projection or rear projection. Front projection is an arrangement in which a light projector and a viewer are in same side of projection screen, and rear projection is an arrangement in which a light projector and a viewer are in opposite sides of projection screen. A projector may use laser beams as light sources. Although it is a well-known phenomenon that laminated glass panels with any type of LCMD films are unsuitable for projection, the reasons are little understood.

To improve image quality, an understanding of the factors contributing to the image degradation is needed. There is a strong need to use a rigid product incorporating LCMD film for projection because rigid forms of material, such as a glass panel, have much better durability for impact and resistance to scratches from daily activity. Glass panel apparatus incorporating LCMD film are a better fit for many applications and protect the LCMD film for a longer lifetime. Due to lack of understanding of the causes of poor image quality, the development of a single apparatus that provides both a switchable privacy glass function and a projection screen function has been hampered. The apparatus 300 combines the advantages of durability, easy to use, well-protected formation with the advantages of projection screen function and switchable privacy function.

When evaluating optical systems, the greater the difference of refractive indexes at an interface, the stronger refraction and reflection will be. Referencing apparatus 200, since refractive indexes of ITO coating 120, interlayer 220 and glass 230 are very close, the solid-solid interfaces 240, 250 do not have much effect on refraction and reflection. Therefore, interface 240 and 250 can be reasonably considered as transparent or non-existent in the following discussion and in practical use. A major reflection occurs on air-solid interface, because there is a large difference in refractive indexes.

Optical properties are dependent on material structure. In FIG. 2, after lamination, the exposed surface of LCMD film 100 (i.e., an air-solid interface) is covered by interlayer 220 and glass 230, the air-solid interface is replaced with the solid-solid interface 240. Since an air-solid interface has a superior optical function for projection, eliminating the air-solid interface 160 may cause many changes in optics properties. Comparing the apparatus 200 and the apparatus 300, overall the structures may have similar components, but for apparatus 200, the two interlayers 220 are replaced with two air layers 310 and sealant material 320 for maintaining the air layer to create the apparatus 300. Comparing the film 100 and the apparatus 200, the distance between scattering LC-polymer layer 110 to first air-solid interface 160 in film 100 is much shorter than distance between scattering LC-polymer layer 110 (within LCMD film structure 100) to first air-solid interface 260 in apparatus 200. This distance is also contributes to projected image quality.

Figure 4:
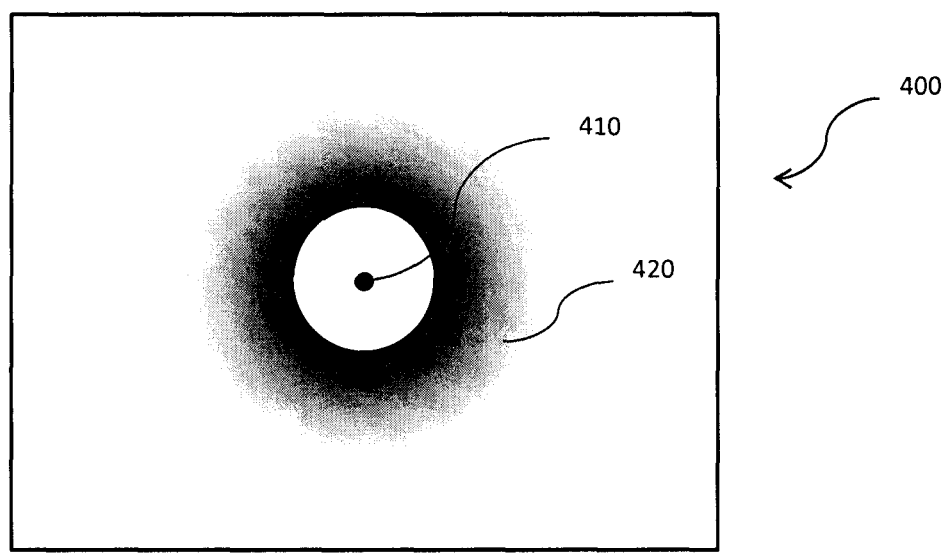
FIG. 4 is a view of a light pattern of a generated by a single point light source on the laminated LCMD panel of FIG. 2.

This invention will first time reveal a reason how blurry images are generated on laminated LCMD glass and how to solve this problem. The present disclosure provides an explanation for the generation of poor projected image quality in laminated LCMD panels and provides embodiments that minimize or eliminate image quality issues. As shown in FIG. 4, in order to clearly explain an optical mechanism associated with a projected image that appears blurred to a viewer, an experiment was conducted in a darkened room using a laser beam aimed at a point 410 on a laminated NPD-LCD glass panel 400 (e.g., such as apparatus 200). An observed laser light pattern 420 was generated on the laminated NPD-LCD glass. What we see from the front view (viewer is on the incident side) is: a shining spot at a center point 410 and a bright ring 420 around the center point starting with a sharp shining edge and turning gradually to dark (note: darkness represents brightness level in the FIG. 4). This experiment simplifies a projection situation by showing that, for laminated NPD-LCD glass, the desirable input light signal is only generated at a center point with the undesirable shining ring generated around the center point. A good projection screen will only display input information at a receiving position, and any relocated light signal will act as a disturbing signal. Since the shining ring is not input light, it therefore acts as a disturbing signal.

Figure 5:
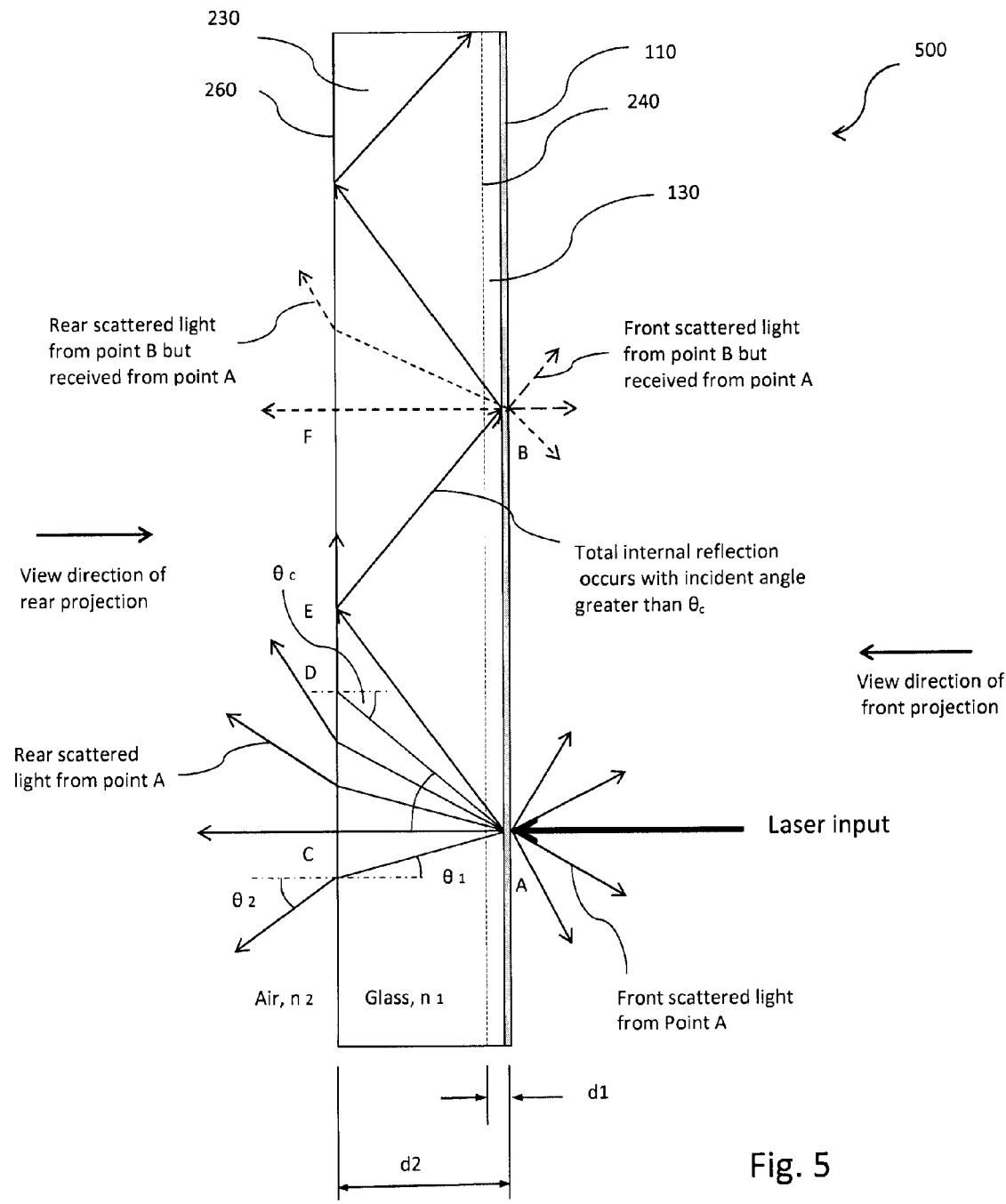
FIG. 5 is an optical illustration of scattering and total internal reflection occurring in the laminated LCMD panel of FIG. 2.

A mechanism of for generating blurry images and a detail explanation of this experiment are illustrated in FIG. 5. In order to reduce unnecessary information in the drawing and following discussion, only half side of laminated NPD-LCD glass panel (e.g., apparatus 200) is illustrated. This situation is very similar to a case of putting a NPD-LCD film on a glass with glue. In FIG. 5, the LC-polymer layer 110, the transparent plastic film 130, and the glass panel 23 are shown. A dashed line represents the interface 240 between film 230 and interlayer 220. Interlayer 220 and ITO layer 120 are not shown because these layers have almost no optical function in this analysis. The thickness of the film 130 is $d_1$ and the total thickness of LCMD film, interlayer, and glass is $d_2$.

In this embodiment, the LCMD film is an NPD-LCD film. When a laser beam points at a point A on the spherical scattering material of NPD-LCD matrix 110, approximately 50% of input energy is scattered back to incident (right) side, as shown with solid arrows. This portion of light is called front scattered light. Another 50% of the light enters into glass 230 at point A. The scattered light from point A with small angle referencing normal line to glass surface 260 may exit from glass 230 with refraction (bent angle), shown with solid arrow on left side of glass surface 260. Refraction obeys Snell's Law: $n_1/n_2 = \sin\theta_2/\sin\theta_1$. Appling Snell's Law in this situation, $n_1$ is refractive index of glass ($n_1=1.52$) and $n_2$ is refractive index of air ($n_2=1$). When $\theta_2$ is equal to 90 degree, $\theta_1$ becomes critical angle $\theta_c$ (41.1°). When the incident angle to the glass surface 260 is smaller than 41 degrees, the scattered light escapes from glass surface 260, and this portion of light is called rear scattered light. However, when incident angle on glass surface 260 is greater than critical angle $\theta_c$ (41°), the scattered light totally reflects back to inside of the glass layer 230. This phenomenon is called as total internal reflection. Total internal reflection reflects the scattered light back to LC-polymer matrix layer 110 at other locations such as point B. Point B will do secondary spherical scattering like point A and generate front scattered light and rear scattered light shown with dashed line arrows. However, the source of the scattered light from point B is coming from point A through the total internal reflection at point E. In this way, point B delivers light information which belongs to point A. Therefore, such relocated light signal acts like an interference signal or noise generating unwanted blur. In FIG. 4, there is dark area (dark in the laser experiment, white in drawing) between center spot 410 and shining ring 420. The inner diameter of shining ring 420 corresponds to the critical angle $\theta_c$ and the thickness of the glass 230. The incident light at points on surface 260 with smaller incident angles $\theta_c$ may escape from the glass 230 and total internal reflection creates an interference signal at a limited diameter about point A. The area between the incident point A and the ring generated by total internal reflection is free of noise, showing dark. However, in real image projection, such as video projection, no such dark area exists because the entire projection area is receiving input signals, and any point may be an area receiving total internal reflection from other points. The noise signal at point B keeps bouncing within the structure for more total internal reflections. After each bounce, light reaches to LC-polymer matrix 110, and then most of reflection energy is lost to scattering. The noise signal is attenuated with its spreading. Therefore, the shining ring 420 gradually turns dark at its outer edge.

This laser test may provide more information about optical properties of laminated NPD-LCD glass. It not only qualitatively explains how blur is generated, but also may quantitatively provide a level of blur. Quantitative information may be used to guide developed applications. In order to quantitatively calculate different portions of lights, an equation of spherical crown is used, because NPD-LCD has spherical scattering and surface of spherical crown may be used to represent rear scattered energy. Rear scattered energy is represented by $E_{rs}$. Two letters are used to represent a distance between the two points, for example, CD represents a distance from point C to point D and AD represents a distance from point A to point D. Therefore, $E_{rs}=\pi[CD^2+(AD-AC)^2]$. Calculated date in this experiment is listed in Table 1.

TABLE 1

| Lights | Light Energy (%) |
|---|---|
| Total input energy at point A | 100 |
| Front scattered light at point A | 50 |
| Light entering into glass from point A | 50 |
| Rear scattered light $E_{rs}$ from point A | 12 |
| Total internal reflection energy from point A | 38 |
| Noise distributed in front side as first ring | 19 |
| Noise distributed in rear side as first ring | 5 |

The following discussion explains how the data were obtained and what the data mean in optical properties. First, a laser beam perpendicularly points at point A on a panel with NPD-LCD film and glass, 50% of input light is scattered back to incident (right) side. The other 50% of light enters into the glass. Referencing normal line to glass surface 260, rear scatted light from glass surface 260 is 25% of light entering into glass or 12.5% [=25%×50%] of total input light. Total internal reflection is 37.5% [=50%-12.5%] of total input and becomes noise. Second, this near 38% of interference energy is not equally distributed in both sides of the glass, and actually distributes 19% [=38%×50%] of this portion scattered on right side as blur and ¼ or 5% [=38%×50%×¼] of interference energy pass through the glass surface 260 as blur on left side. To simplify the discussion, this calculation ignores third and higher classes of bouncing. Third, a blurry level can be determined by noise energy. As front projection, viewing from right side has 19% of blur. This energy is distributed at outside of ring with a center at point A. It is important to notice that there is no noise signal in inside of ring from to front view. It explains why the ring illustrated in FIG. 4 has a sharp inner edge. For rear projection or viewing from left side, noise energy is 5% and distributed around a ring with a radius of CF. Since noise energy (19%) of front view is four times greater than noise energy (5%) of rear view, it explains why front view has poorer image quality. This conclusion matches the viewer's experience. With the information of glass thickness, an inner diameter of the laser shining ring 420 can be used to find out the reflective index of glass. With the same principle, other information, such as scattering capability, symmetry of scattering light, or coefficient of oval effect, etc. on LCMD film can be obtained from similar testing.

A further question for consideration is why 3G Switchable Film, i.e., NPD-LCD film, has a great image quality on film alone, but poor quality on laminated NPD-LCD glass. The discussion above may apply not only laminated LCMD glass, but also LCMD film. It should be noticed that there is great difference in thicknesses between the laminated glass and the film. In FIG. 5, $d_1$ is film thickness and $d_2$ is glass thickness (including film and interlayer). Greater thickness requires the first total internal reflection light to cross a larger distance. A smaller thickness limits first total internal reflection in small range. When original light information of point A shifts to point B through total internal reflection, there is a high likelihood that unwanted information will be brought to point B. This relocated light information from point A to point B will interfere with original light information received at point B directly from projection. The larger distance is between the two points A, B, the more chances to disturb the original light information. Here, original light information means light received directly from a projection, and relocated light information means light not received directly from a projection. When relocated distance (between point A and B) is reduced, the original information between these two points is gets closer and closer because these two points are reaching to one point. In the actual situation, film thickness $d_1$ may be approximately 0.13 mm and an approximate glass thickness $d_2$ is ¼ inch. There is a 49 times difference in thickness, and, therefore, the images on the NPD-LCD film are much clearer than images on the laminated NPD-LCD glass.

The above analysis reveals the importance of an air-solid interface 160 at the film surface to image quality. If this air-solid interface is maintained, the good quality of projected images on the NPD-LCD film may be preserved. Apparatus 300 has utilized this important discovery and kept a good image quality on projection. Any glue or adhesive used between LCMD film and glass layers will have the same function as an interlayer in laminated LCMD glass. Such glue or adhesive makes an air-solid interface of film 100 disappear and increases the distance from LC-polymer layer 110 to first air-solid interface, therefore, greatly reducing projected image quality. Besides the described benefits for projection, air-sandwiched switchable glass apparatus 300 has many advantages in comparison with laminated LCMD glass.

The manufacture of an air-sandwiched LCMD glass like apparatus 300 has a great advantage in energy consumption as compared to the manufacture of laminated LCMD glass like apparatus 200, because the manufacturing process for apparatus 300 may be conducted at room temperature, whereas the lamination process must be conducted in high temperature. The lamination process also needs large equipment such as autoclave or vacuum oven. Avoiding high temperature manufacturing process is also favorable for extending the lifetime of LCMD film.

The materials used to form apparatus 300 may also be preferable to the materials used to form apparatus 200. The apparatus 300 avoids the use of an expensive interlayer and vacuum air bag, reducing materials costs. Omitting the interlayer of apparatus 200 also eliminates the optical distortion associated with the interlayer.

The process for creating the apparatus 300 may also be much easier and simpler than lamination process used to create apparatus 200. Lamination has special requirements on thickness of glass. The uniformity of heating and pressure required for lamination requires glass that is neither too thick nor too thin. The air sandwiching process used to form apparatus 300 permits greater variations in thickness of glass, including paper-thin glass. Commercially available super thin (0.55 mm) glass even makes the air sandwiching process as simple as the common assembly of prefabricated furniture kits. For example, in various embodiments, a layer of LCMD film may be adhered to existing glass (e.g., in a window or glass door). To form the apparatus 300, a layer of super thin glass may be applied to the LCMD film with spacers (including e.g., tape) separating the layer of super thin glass from the LCMD film.

Comparing production efficiency, the air sandwiching process used to form apparatus 300 may have a much higher efficiency. A lamination process uses an autoclave and needs to vacuum several hours to remove air from an air bag containing five layers of different materials like LCMD film, interlayer and glass. It is difficult to remove air between the interlayer and glass, and any contamination of air will cause defects on final laminated glass with shining air bubbles. In order to save energy and time, lamination with autoclave needs to accumulate many semi-finished products in autoclave and then start to heat together. In order to keep temperature uniformity on the materials in an autoclave, a slow heating process is required. In order to avoid glass breaking, a slow cooling process is required. Lamination with a vacuum oven has similar inefficiencies, except no additional pressure is applied on the air bag. These requirements result in a low efficiency overall process of lamination, usually needing an entire day to finish one process cycle. The new air-sandwiched structure of apparatus 300 simplifies the production process and may greatly increase efficiency. Since an uncured interlayer and positive mode of LCMD film are non-transparent or translucent, aligning several layers of the translucent materials in the right position is a skillful work and takes time. Air-sandwiching one layer of LCMD film between two pieces of clear glass may be a simpler process. Processes to make air-sandwiched projection glass as in apparatus 300 may be easily completed in less than one hour. It is very suitable for production with an automatic production line. Since an air-sandwiching process does not need specialized equipment and material, it may be as simple as common assembly of pre-fabricated furniture. Production for sandwiched switchable glass can be conducted not only in mass production, but also by a single person or at customer job sites. On the other hand, preventing delamination is important to the production of laminated LCMD glass because any delaminated area is bright. Uneven bottom edges of two pieces of glass may contribute to delamination because of shearing force generated between two pieces of glass. Delamination may occur on any layer of a LC-polymer matrix, between a film and an interlayer, or between an interlayer and a pane of glass. Often the use of suction cups to move laminated LCMD glass is discouraged due to the delamination potential. These risks do not exist for the air-sandwiched structure. It is generally safe to use suction cup movement in the production of apparatus 300. Therefore, production yield and installation yield are higher.

The costs associated with producing and using the apparatus 300 are, therefore, reduced compared to apparatus 200, with energy savings, less material usage, simple equipment needs, simple process, and high efficiency. The production of air-sandwiched projection glass may cut two thirds of the costs as compared with the production of laminated LCMD glass. Apparatus 300 not only combines advantages of privacy, projection and durability, but also greatly reduces cost by utilizing simpler process and less material as well as man force. Such new structures and new features may have many new applications.

Switchable projection panels (SPP) such as apparatus 300 add a projection function over prior laminated LCMD glass. The apparatus 300 may provide a cost reduction as compared to laminated LCMD glass, but greatly increases the value and enlarges the applications of the product. SPP may have a variety of applications, such as a building window, light diffusion applications, energy saving applications, privacy applications, dry erase boards, and projection screen functions. SPP may be used in homes, offices, classrooms and hospitals, stores, malls, airports and companies for various purposes like entertainment, advertising, education and work.

For some applications of SPP, such as glass curtain wall for a building or projection advertising wall, safety may be a concern. All types of architectural safety glasses, including reinforced, toughened and laminated glasses, may be used as glass 230. Glass 230 may be in more durable forms such as laminated glass, tempered glass, hurricane proof glass or bulletproof glass to enhance strength and safety. Any transparent panel with special features such as safety, double-layered or self-cleaning may be used as glass 230, as long as air layers 310 in basic structure of SPP 300 are remained. More specifically, laminated glass may be formed with two or more layers of silica-based glass or combination of silica-based glass and polymer-based panel. Bulletproof glass is one kind of laminated glass with strength capable to block a shooting bullet. Laminated glass may be formed by interlayer with autoclave or vacuum oven process, or by resin with UV or catalyst or thermo curing process. Although these methods may provide the highest strength like bulletproof glass, resin process has much lower cost. Day light curable resin, DayLightCure, may have the lowest cost, because it utilizes nature light to cure resin without a need of special curing equipment. SPP with enhanced glass 230 is safer when used as glass wall of a building.

Figure 6:
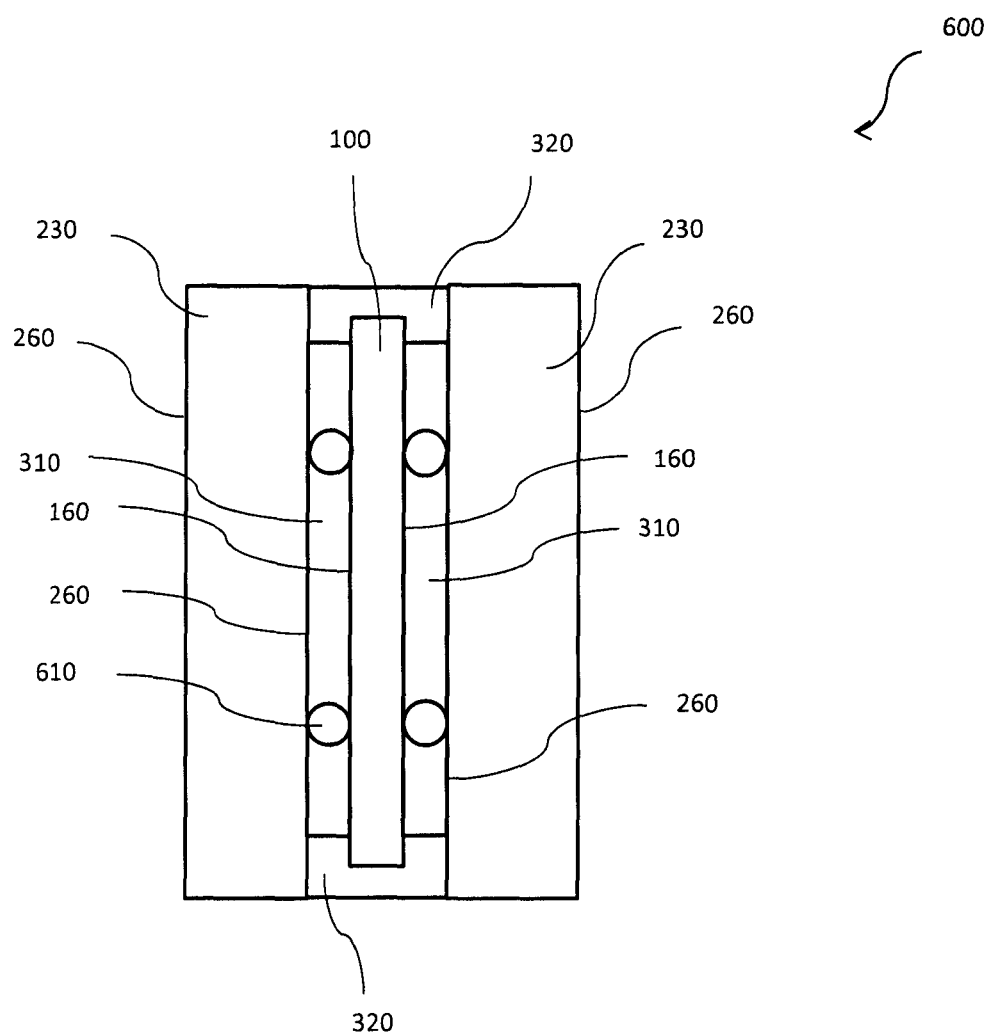
FIG. 6 is a cross-sectional view of a switchable projection panel with spacers according to an embodiment of the present disclosure

FIG. 6 illustrates a cross-sectional view of a switchable projection panel 600 with micro-spacers 610 placed within an air layer 310 between LCMD film 100 and glass 230. Some effectively invisible micro spacers 610, having for example a diameter of 10-50 micrometers, can be sprayed, printed, or otherwise deposited between film 100 and glass 230. The spacers 610 may be ball shape, cylinder shape or other shapes. An edge seal 320 may cover the edge of LCMD film 100. In this embodiment, which has a similar structure to apparatus 300, air-sandwiched switchable glass can be used for storefront advertising glass. Sometimes, moisture and large change in temperature can make film and glass surface stick together to produce rainbows. The use of the spacers 610 may prevent the occurrence of rainbows and provide high quality projection capability.

Figure 7:
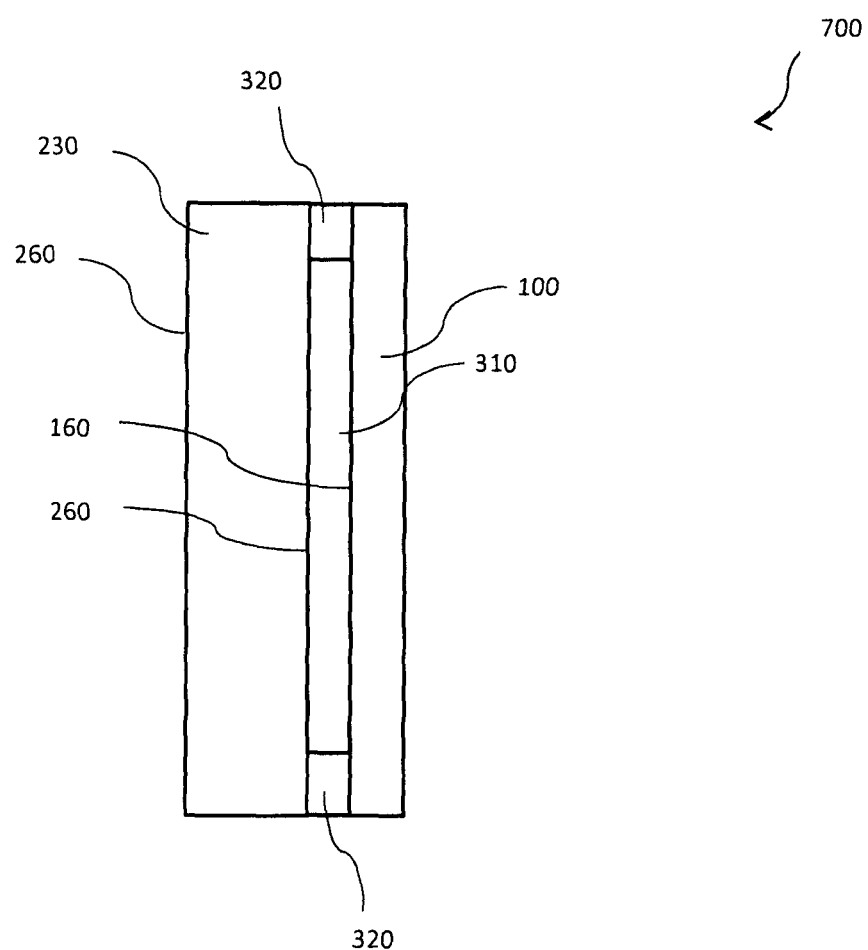
FIG. 7 is a cross-sectional view of a switchable projection panel with a single layer of glass according to one or more embodiments of the present disclosure.

Referencing FIG. 7, in some applications in which preventing scratches may not be important or necessary, a second layer of glass may be omitted. Thus, an LCMD glass panel 700 includes the LCMD film 100 exposed to air on one side and exposed to an air layer 310 on an opposite side. Opposite the LCMD film 100, the air layer 310 is bounded by the glass pane 230. Seals 320 provide separation, creating an air layer 310 between the glass 230 and the film 100. The seals 320 may provide an air-tight seals but an air-tight seal is not always necessary. LCMD film 100 may be coupled to existing glass with double sided tape at edges as seals 320. Seals 320 may serve to create an air gap and bond the glass and LCMD film. For example, only two opposite openings of the air layer may be sealed while the other two opposite openings of the air layer may be open. In some alternative embodiments, spacers 610 may be used within the air layer 310.

In various embodiments, including the embodiments of FIGS. 3 and 6, two layers of glass may be the same thickness or one may be thicker than another. When very thin glass, such as 0.55 mm thickness, is used, the manufacture process not only can be conducted in a factory but also can be conduct at a job site or a home using a simple assembly process. NPD-LCD film can be installed on existing glass with double sized tape or other adhesives tapes at edges. Many tapes with a strong adhesion are available commercially. Various adhesion materials and technologies can be used for bonding sandwiched structures. The methods include patterning glue delivery and screen printing and curing by heat, UV, catalyst or moisture.

Television and video and motion picture images are more powerful for delivering information than still pictures or letters. Large sizes of video images are very good for advertising. However, displays capable of showing large video images are very limited in use for both indoor and outdoor applications. Although a light emitting diode (LED)

display is one type of display, an LED display is usually every expensive and has large energy consumption. Energy consumption of full color LED display may be around 1 kw per square meter. Since LED displays have low density or resolution, they may be unsuitable for close viewing. Compared with LED images, projection images have much higher image quality (e.g., easily to achieve high density HD images) and much higher gray scales or colors (up to billions) than images on LED display. Projected images on switchable projection glass are suitable for both close viewing and long distance viewing. SPP projection systems have very low cost (e.g., about 10% of LED cost) and very low energy consumption (e.g., about 1% of LED energy consumption). However, projection techniques are usually is not suitable for use under bright ambient light. One of reasons is that projection screens with high contrast usually have lower light output, efficiency, or screen gain because materials of projection screen absorb a considerable portion of projected light. Theoretically, if a projection screen material delivers and outputs all of the received light, the screen should appear much brighter. The air-sandwiched embodiments of this disclosure (e.g. FIGS. 3, 6, 7) overcome the problems associated with the projection in ambient light by utilizing the non-absorbing function of NPD-LCD film or LCMD film. NPD-LCD film is transparent for all visible wavelengths and regulates light only by scattering, that is, it only changes the light direction but does not absorb light. This property may be utilized to increase the brightness of the projection screen.

For projection, ambient lighting conditions are important. Many projection screens require a dark environment. In order to broaden the possible applications for switchable projection glass panels. It is necessary to enhance the image quality of projection under a bright ambient light. Quality may be significantly improved by improving the contrast ratio. Since bright portions of projected images can be easily enhanced by a more powerful projector, including a laser projector which uses laser beams as light sources, a black color cannot be created by a projector. Black portions of projected images are only dependent on the environment or color of the projection screen. Therefore, increasing projection lumens or/and darkening LCMD film may be helpful to improve image quality.

Figure 8:
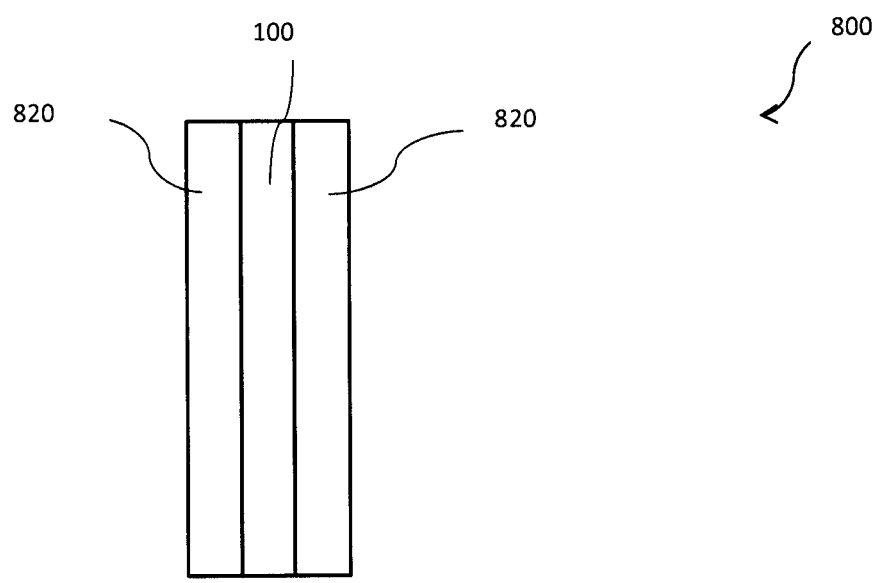
FIG. 8 is a cross-sectional view of a filtered LCMD film according to one or more embodiments of the present disclosure.

FIG. 8 is a cross-sectional view of a filtered LCMD film 800 according to one or more embodiments of the present disclosure. A color filter 820 including, for example window tinting film, may be added on one side or both sides of the LCMD film 100. Color filter 820 and film 130 can be fused together. In this embodiment the darkened LCMD film 800 may greatly increase picture quality under a bright ambient light. Dark LCMD film 800 is capable of providing a high contrast ratio under a bright ambient light. Many darkness levels of window tinting films are commercially available from 5% to 95% transmittance. Both sides may be used for projection and view. High quality projected images on dark LCMD film 800 can be achieved under most indoor lighting conditions by a common projector such as 3000 lumens projector or more powerful projector depending on projection sizes.

Figure 9A:
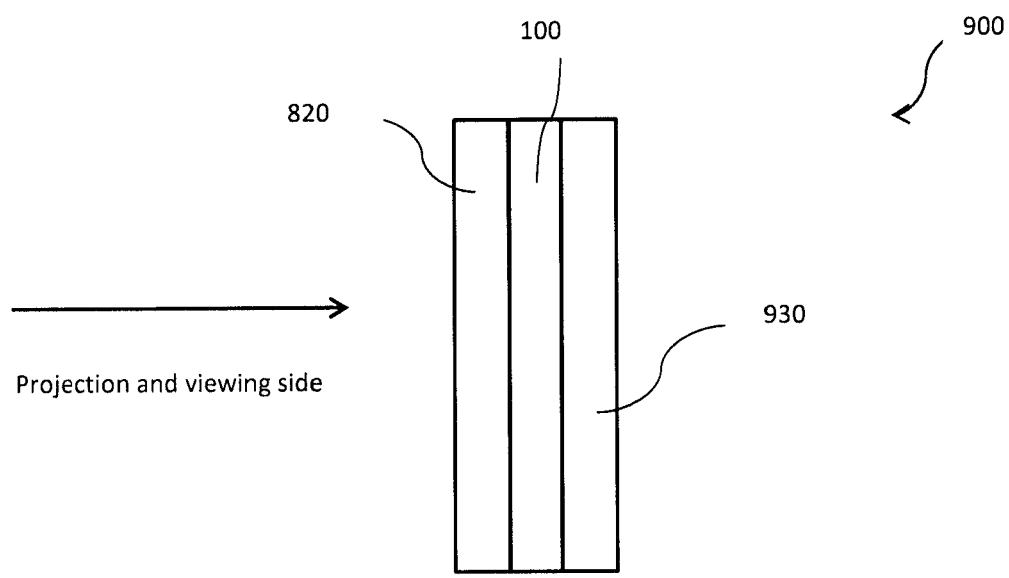
FIG. 9a is a cross-sectional view of an enhanced reflective LCMD film according to one or more embodiments of the present disclosure.

In front projection, it is possible to enhance projected quality under bright ambient without increasing projector lumens. A reflective layer 930 is added in one side of LCMD film with or without adding a color filter 820 in the opposite side. FIG. 9a is a cross-sectional view of an enhanced reflective LCMD film 900. A color filter 820 or window tinting film is added in one side of LCMD film 100 and a reflective layer 930 is added to the opposite side. Reflective layer 930 may include materials such as aluminum foil, silver color metallic paint, white color paint, mirror coating, metal plated coating and metal plate. Gray window tinting film is good option with a low cost. Color filter film including window tinting film and LCMD film are usually made of polyester film or PET film. For projection, color filter 820 and film 130 can be fused together. On another (right) side, transparent ITO coating 120 in LCMD film 100 can be replaced with a non-transparent and reflective metal coating, such as aluminum or nickel or silver coating. Combination of using different color filter films and reflective layer has many important advantages in improving quality of projected images.

Figure 10:
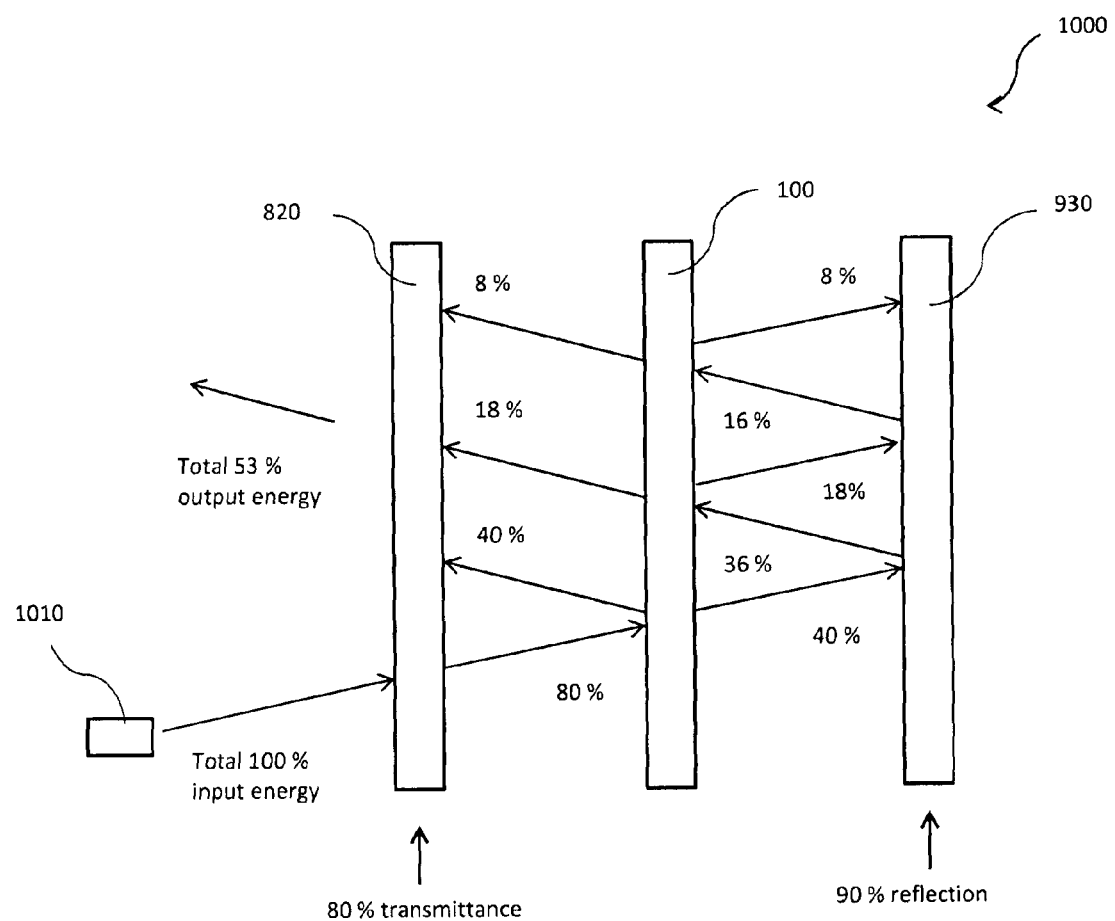
FIG. 10 is an exploded cross-sectional view of the enhanced reflective LCMD panel of FIG. 9a illustrating the optical behavior of the light energy.

An enhancement mechanism of dark reflective LCMD film 1000 may be analyzed in the exploded view of FIG. 10. The reflective layer 930, the LCMD film 100, and the color filter 820 are separated to show the transmitted light intensity or energy and scattered light intensity. A projector 1010 is used as input light energy. In this embodiment, a color filter 820 or window film with 80% transmittance is used, and an NPD-LCD film 100 with spherical scattering is used as projection surface. In this embodiment, a reflective layer is silver color paint with 90% refection. The calculated result shows that output intensity is 53% which is greater than scattering 50% from original NPD-LCD film. However, such output energy comes from dark surface of enhanced reflective LCMD film 900 (e.g., NPD-LCD film), therefore, contrast will be much better than that on original NPD-LCD film. In this structure, a reflective layer is used to reflect scattered light back to viewing side. Since increasing projector lumens may increase bright portion of projected images and increasing darkness of color filter or window film may increase darkness of projected images, both brightness and contrast ratio may be adjusted as needed, this method and ability can effectively provide high quality of projection images under bright ambient light like a normal indoor lighting condition. Actual tests show that this method can present great video images under 1500 lumens ambient light condition with 3000 lumens projectors. Therefore, projection in any normal indoor condition can be easily handled with dark LCMD film 800 or enhanced reflective LCMD film 900.

Figure 9B:
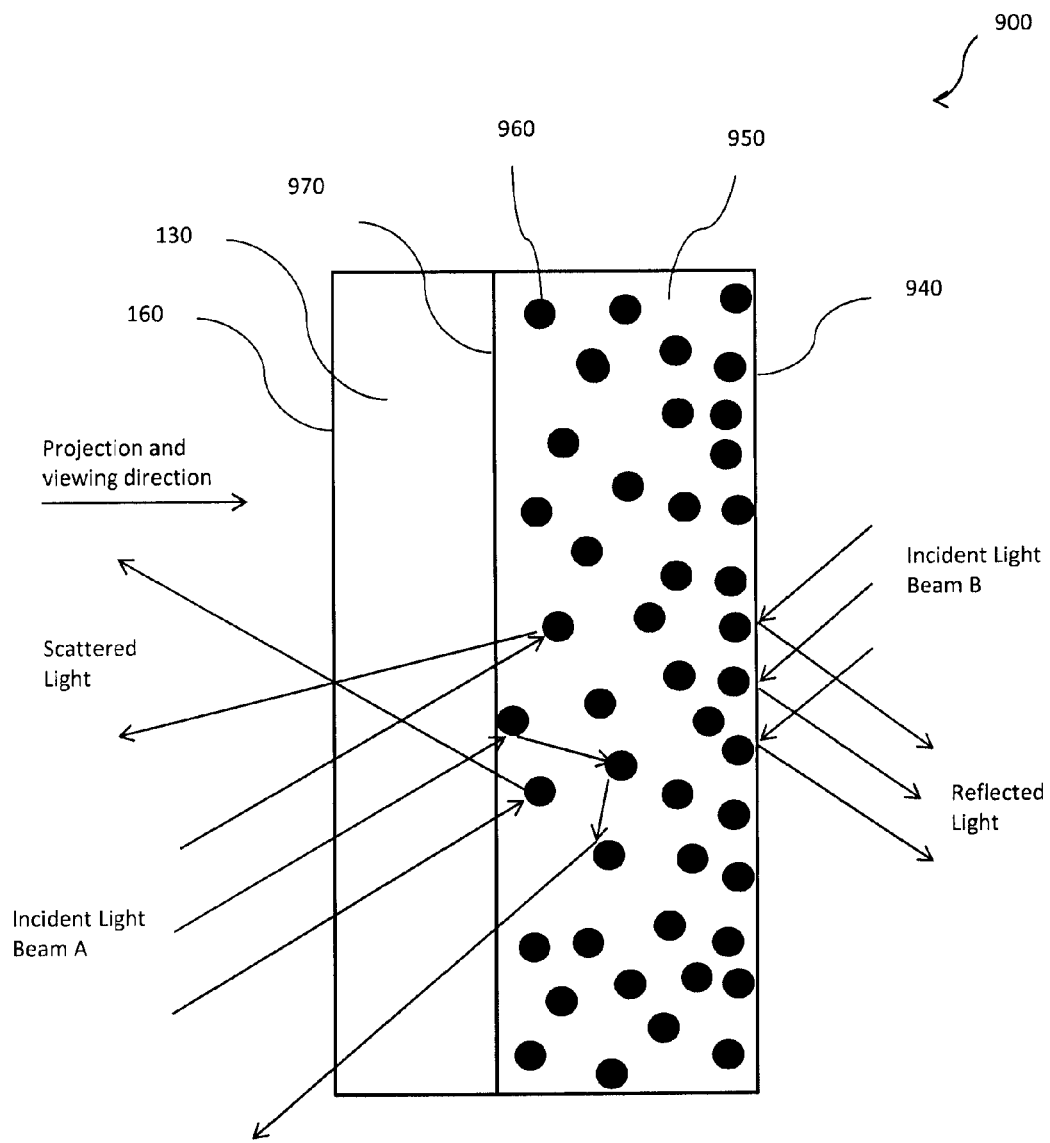
FIG. 9b is an illustration of localized scattering on a metallic painted surface.

Although each of above mentioned reflective coatings or materials, such as aluminum foil, silver color metallic paint, white color paint, mirror coating, metal plated coating and metal plate may easily reach 80% reflection rate, there are three different reflective mechanisms involved. Each mechanism has a different optical efficiency and cost. The mechanism of mirror coating is a pure reflection. If a mirror coating replaces ITO coating, this is an improved situation which reflects original light information back at original spot. However, it is expensive. If a mirror coating or plating is at outside of LCMD film, the thickness of film will shift light information a little. If putting a regular glass mirror in back of LCMD film, it does not work, because a large distance between LC-polymer layer and mirror surface. The mechanism of white color paint on outside of LCMD film is pure scattering. It increases the overall brightness but does not increase contrast, because two scattering layers, or LC-polymer layer 110 and the white paint layer, in both side of film 130 may easily allow light to travel a longer distance to other locations. Referencing FIG. 9b, the mechanism of silver color metallic paint is localized reflection. Due to solvent evaporation from paint surface 940, reflective metal particles 960 are not evenly distributed in paint layer 950. On paint surface 940 side, metal particles have a high distribution density and reflect light to incident light B (right) side, therefore, show shining color like metal surface. On side of paint interface 970, metal particles have relatively lower distribution density which is equal to a rough inter-surface 970, therefore, scatter light back to incident light beam A (left) side and show darker color. Since metal particles suspended in the paint layer 950 are not transparent, they allow incident light to get into paint layer 950 and the scatter back to incident side, which changes one direction of incident light to all directions. Incident light enters into the paint layer 950 and inter-reflection occurs among small localized particles. Incident light can only near vertically exit from the paint layer as a reflection. This phenomenon helps to localize light and reduce noise, therefore, bright areas get brighter and dark areas are not affected. As a result, contrast ratio is greatly increased. It is very obvious to see a visual effect of increasing contrast ratio with silver color metallic paint. As discussed above, function of increasing contrast ratio is performed with color filter or window tinting film 820, now silver color metallic paint has some contribution on contrast. That is why image quality may be improved on film 900 without color filter 820. It is very effective and low cost.

Combinations using different color filters and reflective layers have many advantages in handling bright ambient light and then broaden the applications of SPP. LCMD Film 100 in apparatus 300 may be replaced with dark LCMD film 800 or enhanced reflective LCMD film 900. If only reflective layer is used without using color filter 820 in film 900, projection brightness may be doubled, therefore, larger projection image can be presented with same brightness, or smaller projector can be used with same size and brightness. It should be noticed that enhanced reflective LCMD film 900 is non-transparent, but LC-polymer matrix 110 can be still switchable and controllable with different levels of scattering. With different applied AC voltages, viewing angle and brightness at vertical view may be adjusted.

Increasing contrast ratio contributes an important feature to NPD-LCD film and SPP to be an improved projection screen, because NPD-LCD film already has many great features for projection. NPD-LCD film has a special feature of Viewing Angle Independent (VAI) brightness or same brightness in 360°. This special projection capability allows that an incident light comes from any angle to any point on a surface of NPD-LCD film and the light spot will do a spherical scattering. Scattered light will be equally distributed at any angle in space as well as in both sides of surface of NPD-LCD film. These characteristics make dark LCMD film 800 and enhanced reflective NPD-LCD film 900 to meet all of the highest standards of projection screen with high contrast ratio, wide viewing angle, suitable screen gain and best uniformity of brightness.

Third generation of LCMD film or NPD-LCD film is made with 100% optical transparent non-linear materials and liquid crystals. It depends on scattering to regulate lights. In the other words, it only changes directions of lights, but does not absorb any visible lights. Therefore, it can completely deliver all color information provided by a projector to viewers. All other projection screens with high contrast ratio always absorb some degree of light and lose some information from a projector. NPD-LCD film remains not only a true color, but also provides good parameters for projection screens like screen gain and half gain angle etc. It is important to mention that due to its absolute wide viewing angle, half gain angle for NPD-LCD film does not exist for NPD-LCD film. For all existing projection screens, brightness in vertical view is usually brighter than tilted view. The angle having 50% brightness in vertical view is called half gain angle. Half gain angle usually falls within 90 degree. Half gain angle is an important index for projection, and reflects quality of viewing angle and uniformity of brightness. When NPD-LCD film allows a light to travel in a curved way in non-linear matrix to have same brightness at any angle, some characteristics of linear optics such as incident angle and viewing angle lose their physical meanings. Beyond 90 degree, the definition of half gain angle loses its original meaning for reflection. This feature could greatly impact projection field and be very useful for advertising requiring very wide viewing angle. Furthermore, NPD-LCD film with spherical scattering has another advantage of using a short throw projector which has a throw ratio (i.e., projection distance over projection size in diagonal) of less than 1. Since a short throw projector is mounted quite close to a projection surface, such mounting may eliminate reflection from a projector toward viewers and save space. Most of projection screens with high contrast ratio do not allow using a short throw projector, because treatments for high contrast ratio scarify feature of wide viewing angle.

Dark LCMD film 800 retains all original features of LCMD film 100, but can handle brighter ambient light. Dark LCMD film 800 has some advantages as compared with dichroic LCMD film of which dyes are added in LC-polymer matrix. In comparison between using separated color filter 820 and dichroic dyes, apparatus 800 using separated color filter 820 has better UV stability, because many color filters or window tinting films are made of inorganic pigments or dyes which are much more stable than organic dyes used in dichroic LCMD film. Dichroic LCMD film must use organic dyes because of the solubility of liquid crystals and guest-host effect. Another advantage is that using color filter or window tinting film does not affect response time and shorten lifetime and reduce stability of LCMD film, because organic dyes are more vulnerable from heat and UV than liquid crystals. This is very useful function in many applications requiring color or darkness, such as on switchable projection window, projection billboard, window projection, glass wall, automobile, airplane, ship, and traffic sign or in OLED (organic light emitting diode) TV and 3D TV.

With the air-sandwiched structure and methods of image improvements, sandwiched switchable projection glass may have many new applications. Referencing FIGS. 11*a* and 11*b*, one of embodiment is switchable projection billboard (SPB) 1100, which includes SPP (e.g., apparatus 300) in front of a billboard 1120 and space 1130 between SPP 300 and billboard 1120. A frame 1140 may be an open system or enclosure or omitted. At daytime, the billboard may have regular function showing still image when NPD-LCD film is in clear state. At evening, video images can be shown on SPP when NPD-LCD film is in opaque state. Such multifunctional billboard may enhance its advertising ability. Although LED billboard has been used as billboard for video images, but its expensive cost and difficult repairing and low resolution limit the application. Such switchable projection billboard could be only 5-10% of cost and 5% of energy consumption of LED billboard. A reflective layer and laser projector may give a good brightness. Reflective layer plus NPD-LCD layer and laser projector may give both good brightness and good viewing angle. Reflective layer, NPD-LCD layer, and color filter layer and laser projector may give high quality images. At evening, regular billboards need lights mounted usually at front bottom of the board for visibility. This position is good for mounting projector(s). Wireless technology is easily used to manage advertising content. Projectors with long lasting LED light bulb or microwave light bulb may be used to build a virtually maintenance-free switchable projection billboard.

Figure 11A:
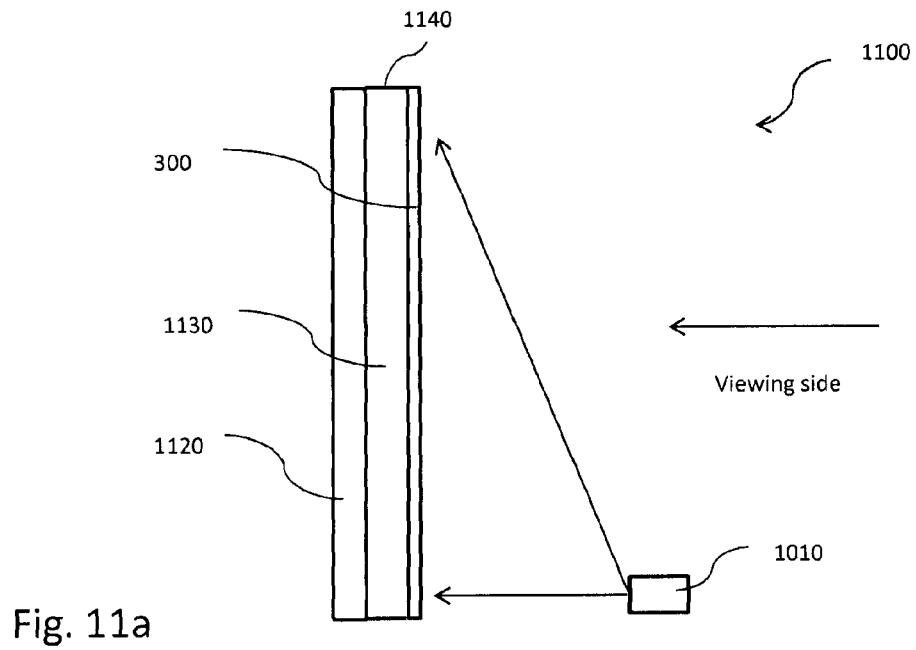
FIG. 11a is a side view of a switchable projection billboard with a switchable projection panel according to one or more embodiments of the present disclosure.
Figure 11B:
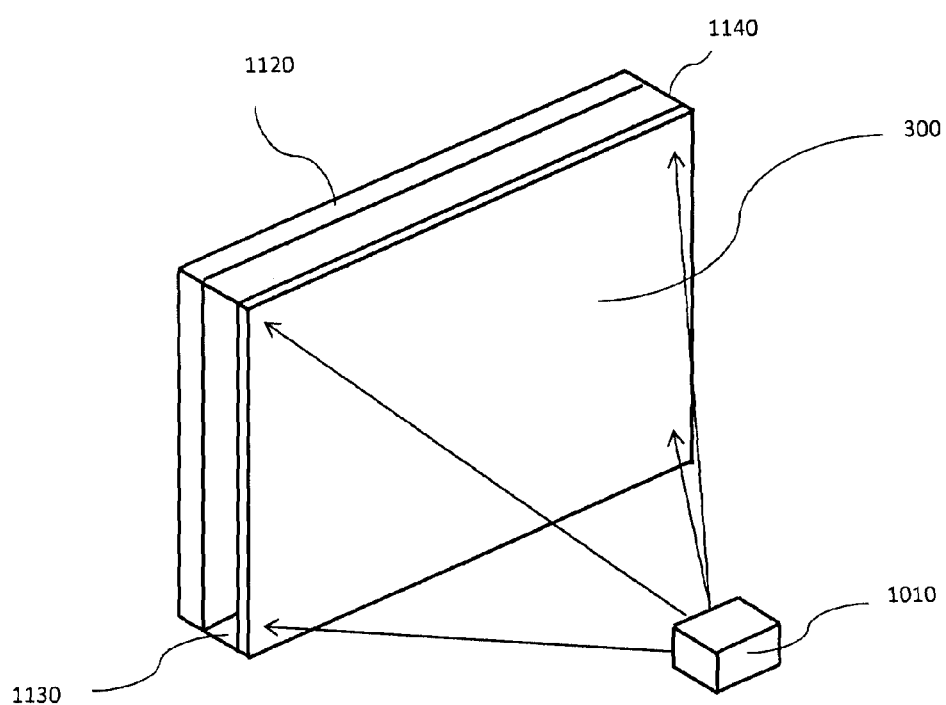

Referencing to FIGS. 11a and 11b, a projector 1010 is placed in front of SPP 300 for front projection. A short throw projector may be placed in front of SPP 300 in short distance. The short throw rate (ratio of projection distance to projected size in diagonal) may be smaller than 0.3. Some short throw projection can be closely or directly mounted on projected surface. Projector position may be placed either bottom or top of SPP 300. There is a distance or space between SPP 300 and billboard 1120. The projection distance (throw) may be short or long. When the distance is short enough, the projector 1010 may be placed in between SPP 300 and billboard 1120 for rear projection. Billboard 1120 may be a flat sign or other types. Switchable projection billboard provides a basic concept, or an advertising board has at least two surfaces with different functions. One surface has still picture showing in day time. Another surface is blank surface suitable for projection in evening. The two surfaces are changeable or switchable.

Figure 12A:
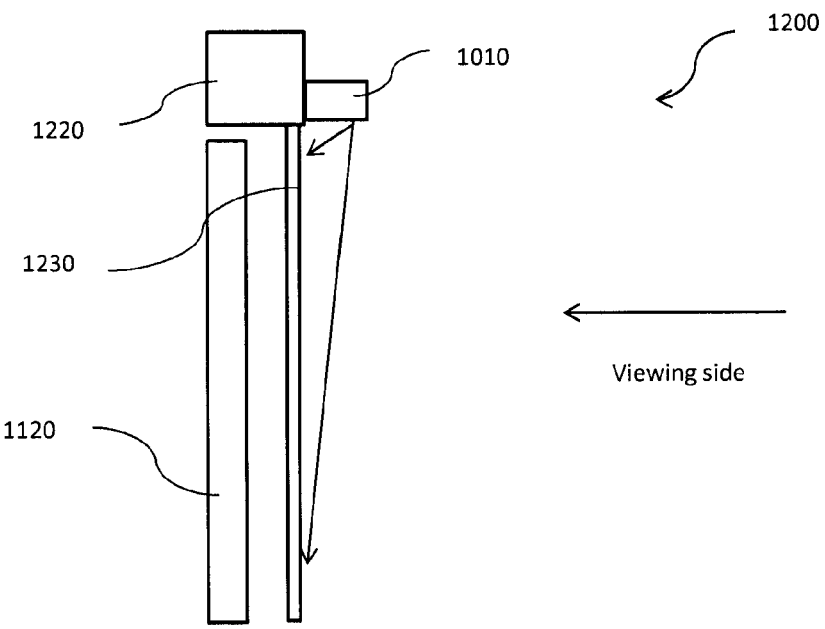
FIG. 12a is a side view of a switchable projection billboard with a rotary system according to one or more embodiments of the present disclosure.
Figure 12B:
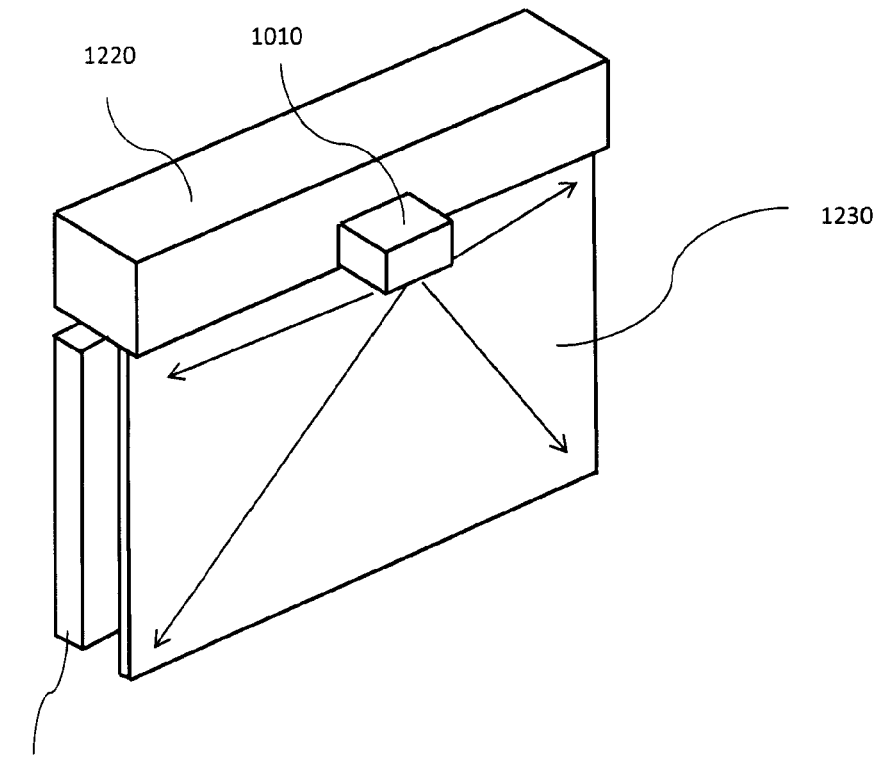

Switching mechanisms for projection billboard includes electric, mechanical, and rotary. Referencing FIGS. 12a and 12b, for example, a motorized screen system 1220 similar to motorized window shade or outdoor rotary blinds or hurricane shutter can be directly mounted on billboard 1120. The SPP may be omitted. Projection surface 1230 of mechanically switchable projection billboard 1200 may have different materials suitable for projection, such as cloth, plastic, fiberglass, metal and painted surface. Switching method includes mechanical or electrical mechanism. Any mechanism or method to provide additional surface suitable for projection may be used for this purpose. A projector can be mounted on top or bottom of projection screen.

Figure 13A:
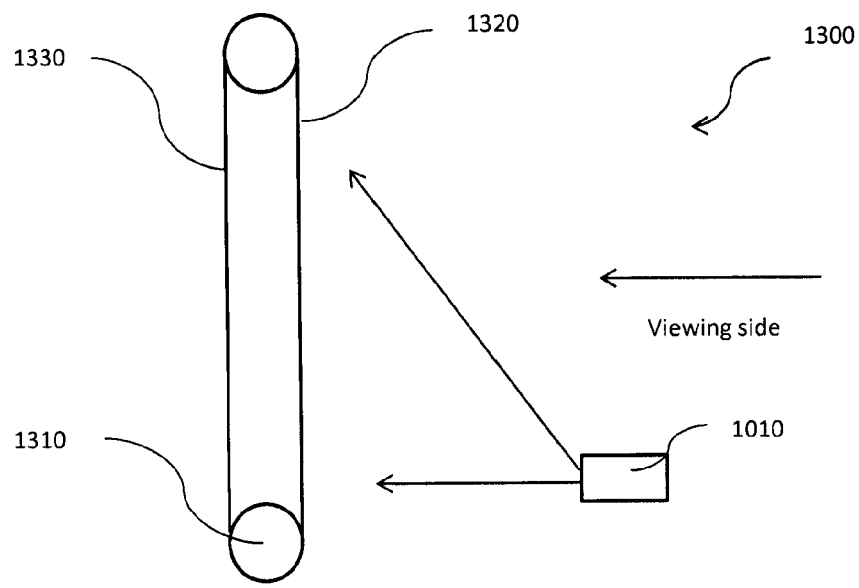
FIG. 13a is a side view of a switchable projection display with scrolling system according to one or more embodiments of the present disclosure.
Figure 13B:
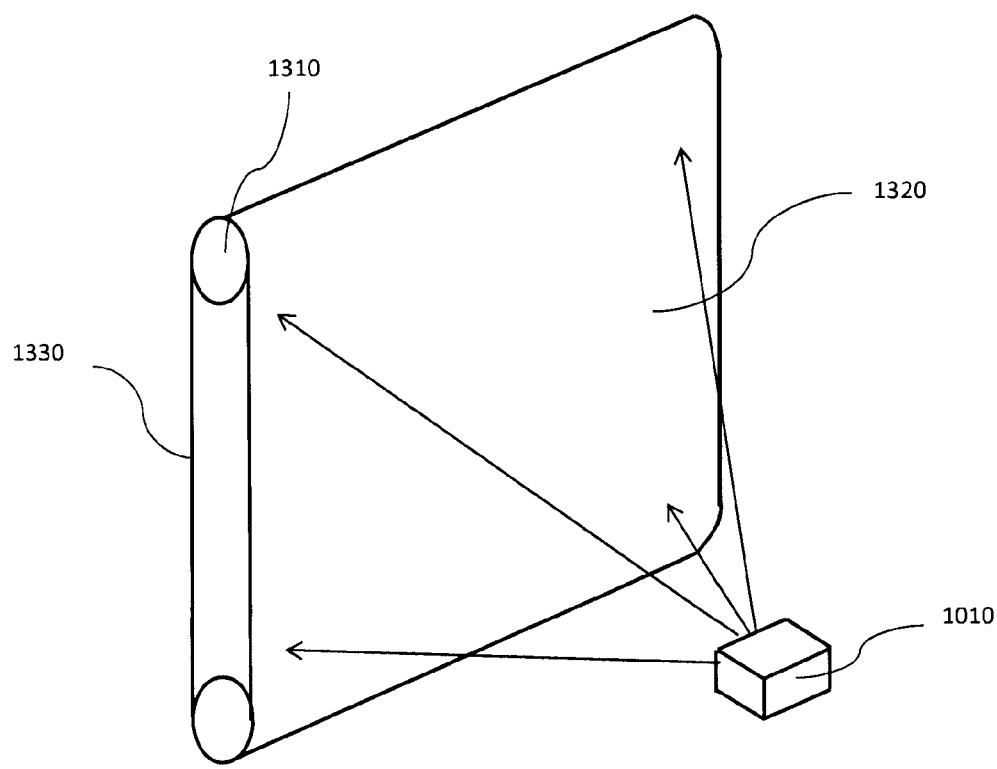
FIG. 13b is a perspective view of the switchable projection display of FIG. 13b.

Referencing FIGS. 13a and 13b, the switchable projection billboard may be type of scrolling poster with scrolling system 1310. In day time, it shows still images at side 1330. In evening, a blank side 1320 is used for showing projected video images. There is a non-loop scrolling design with a single layer between two rollers, so that it is suitable for front or rear projection. This scrolling projection billboard 1300 enhances advertising ability by combining still image and video images together, and keeps the cost at very low level.

Figure 14B:
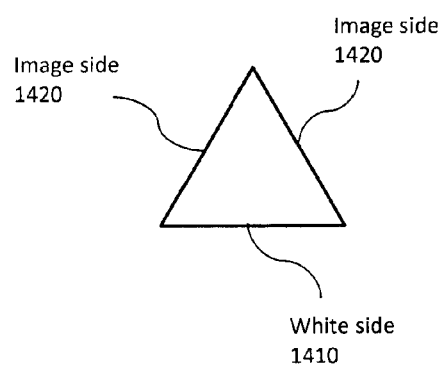
Figure 14A:
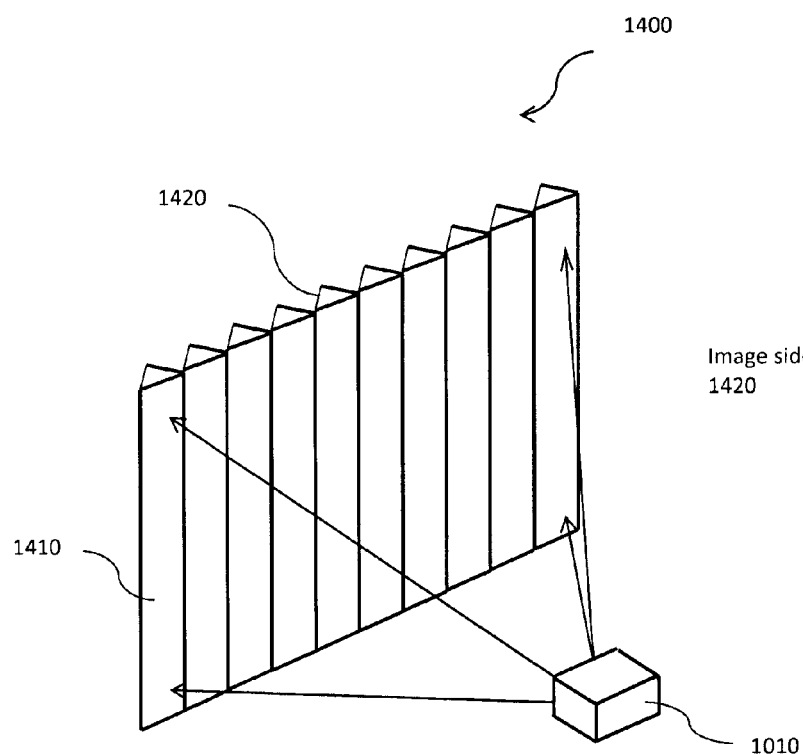
FIG. 14a is a perspective view of a projection triangular prism changeable billboard according to one or more embodiments of the present disclosure.

In FIGS. 14a and 14b, the switchable projection billboard may be also triangular prisms changeable billboard 1400. For better image quality, one side of triangular prisms may be made of enhanced reflective NPD-LCD film 900 or other materials suitable for projection. In daytime, two image sides 1420 of triangle changeable sign can do still image advertising. At evening, projected images are displayed on white side 1410 of the triangular prisms to show video images. This projection triangular prisms billboard 1400 enhances advertising ability by combining still images, changeable images and video images together, and keep the cost at a very low level.

Indoor brightness is usually much lower than outdoor brightness. In airport, brightness is usually under 300 lumens. In offices or shopping centers, brightness is usually around 500 lumens. Even in malls with sky windows, brightness is usually under 1000 lumens. On the other hand, brightness in shade of outdoor in noon may beyond 10000 lumens. In normal projection, a dark ambient light is usually required like in theater and home theater. Replacing the LCMD film 100 in apparatus 300 with dark LCMD film 800 or enhanced reflective LCMD film 900 may provide greater quality of projected images at ambient light conditions over 2000 lumens. Therefore, SPP like apparatus 300 with LCMD film 100, dark LCMD film 800, or enhanced reflective film 900 can have many indoor applications under almost any indoor condition. There are various forms in use of these SPP display devices.

Figure 15:
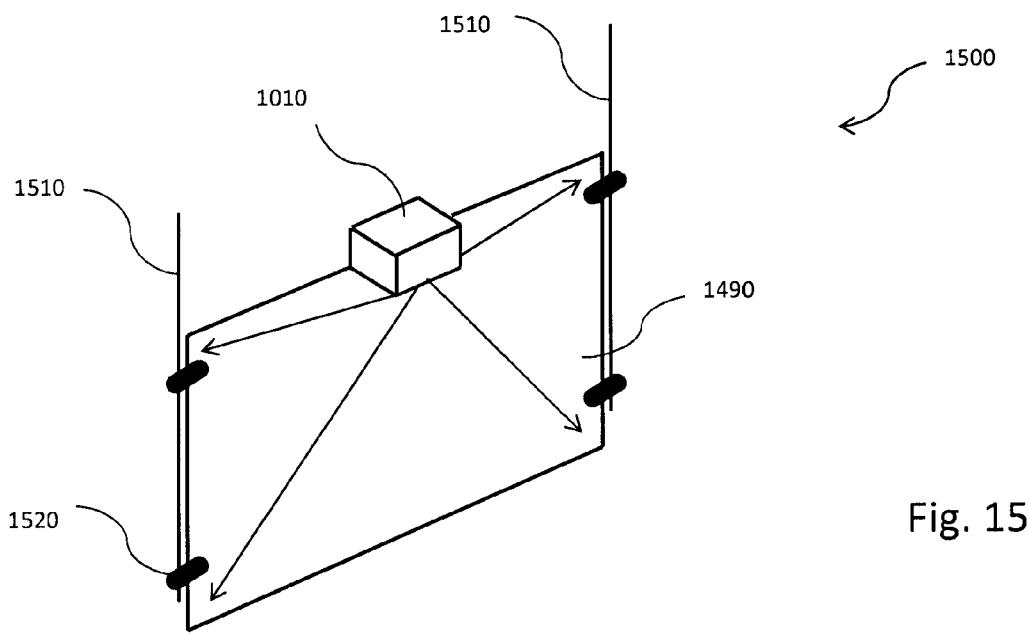
FIG. 15 illustrates a switchable projection display system with ceiling mounting mechanism according to one or more embodiments of the present disclosure.

For examples, FIG. 15 shows a SPP display system 1490 (e.g., same or similar to 300, 800, 900) as a component of a hanging system 1500. The SPP 1490 may be suspended under a ceiling with a cable system 1510. With use of clamping head 1520 in cable system 1510, there may be no need to use edge seal 320 in the SPP 1490. If LCMD film 100 or dark LCMD film 800 is used, the SPP display system 1490 can be viewed from both sides. If enhanced reflective LCMD film 900 is used, SPP display system 1490 can be viewed from one side for front projection.

Figure 16:
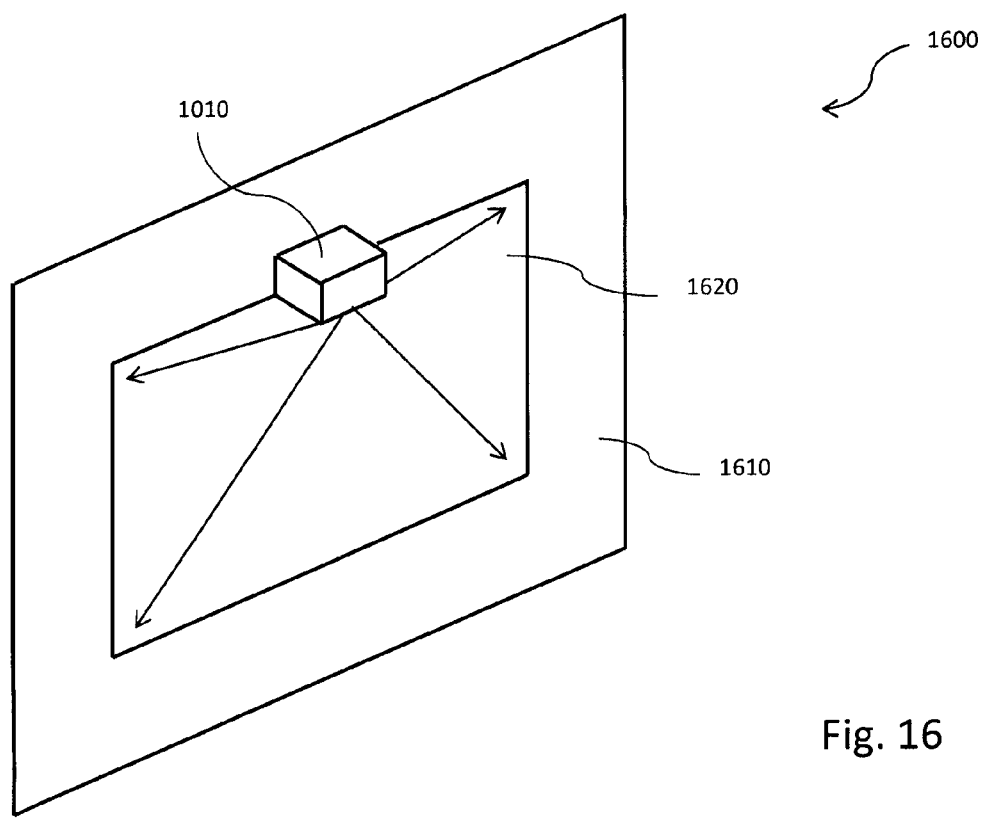
FIG. 16 illustrates a switchable projection display system with wall mounting mechanism according to one or more embodiments of the present disclosure.

Referencing FIG. 16, a wall-mounted system 1600 includes a SPP display system 1620 (e.g., including apparatus 300, 800, or 900) mounted on a wall 1610. If LCMD film 100 or dark LCMD film 800 is used with the SPP display system 1620, the projected image may be viewed from both sides. If reflective film 900 is used, the projected image may be viewed from a single side. Wall 1610 includes all kinds of non-transparent regular walls and transparent glass walls and potable panels. Some small short throw projector can be mounted closely or directly on projection surface. With current projection technology, a projector can provide TV, movie and computer information. Such devices have many functions and uses such as, see-through, adjustable opacity, privacy & energy saving, movie, TV, presentation, both side viewable, dry-erase whiteboard. Such application may be used as store banners. When rear projection is used, the projection surface may be front surface of enclosure and projector is protected inside of the enclosure.

Figure 17:
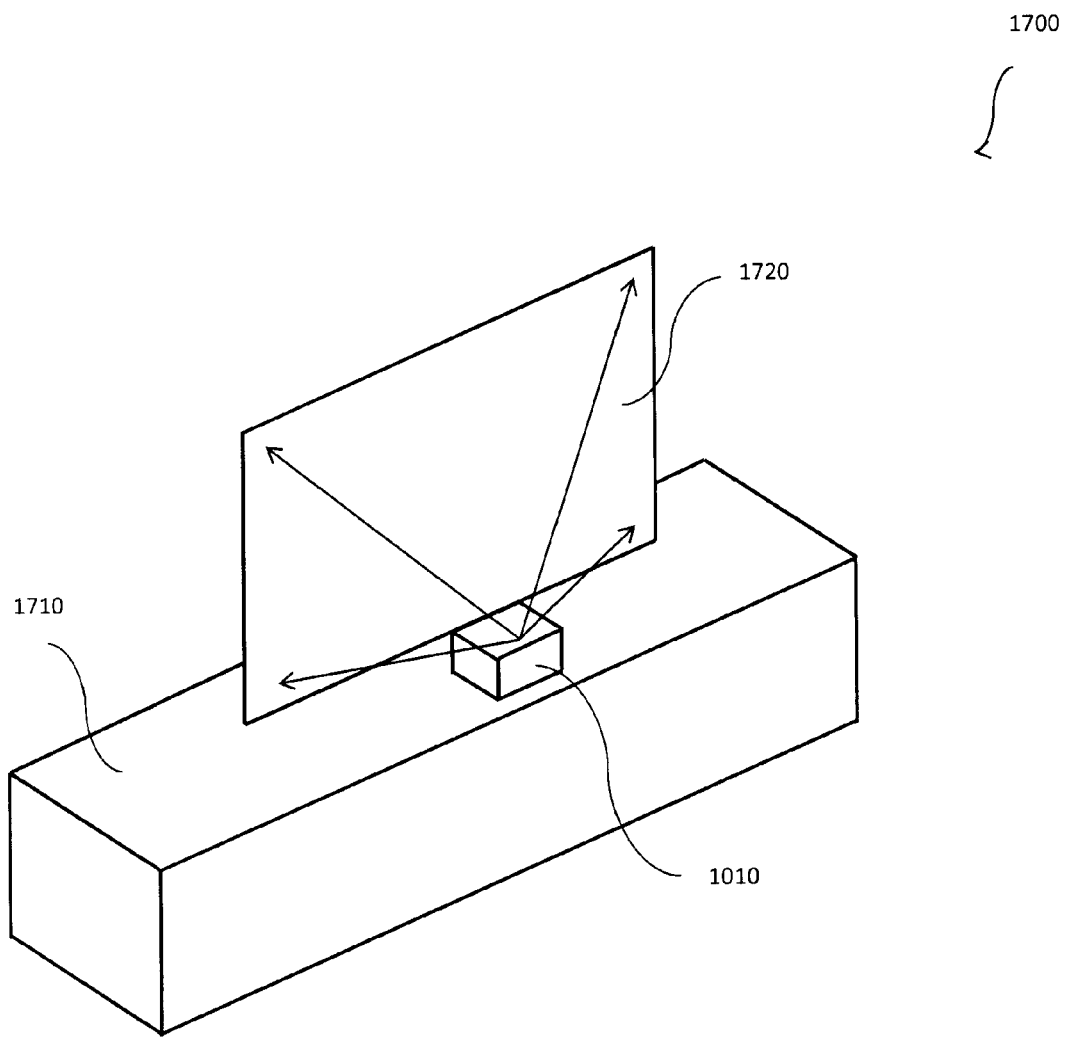
FIG. 17 illustrates a switchable projection display system with a table, showcase, or cabinet mounting mechanism according to one or more embodiments of the present disclosure.

FIG. 17 shows a SPP showcase 1700 in which SPP 1720 (e.g., including apparatus 300, 800, or 900) is mounted on a table, showcase, cabinet, or sales counter 1710 for both side views if LCMD film 100 or 800 is used, or for one side view if enhanced reflective LCMD film 900 is used. The SPP 1720 could be with or without a wall round. Wheels can be mounted under the cabinet 1710 to make it easy to move. The cabinet 1710 may be transparent or non-transparent and made of glass or plastic or other classic materials for furniture. Such device may be used in store, mall, school, company or home. If used for sales, some product samples can be placed on the cabinet or inside of cabinet. Such showcase may bring merchandise, information on the merchandise and consumer in sales site and may be more efficient for sales. In normal sales and advertising, these three key factors are usually separated, causing an inconvenience and a low efficiency in convincing consumers to purchase.

If anti-reflective coating is applied on every air-solid interface of any device mentioned above, image quality may be improved. However, practically there is no perfect anti-reflective coating existed. Most anti-reflective costing may reduce reflection but cannot eliminate reflection. Therefore, total internal reflection in laminated LCMD glass still occurs and problems still exist. On the other hand, anti-reflection is very expensive and high cost has greatly limited its uses. Anti-glare coating has very limited help and improper use could increase blur.

Figure 18:
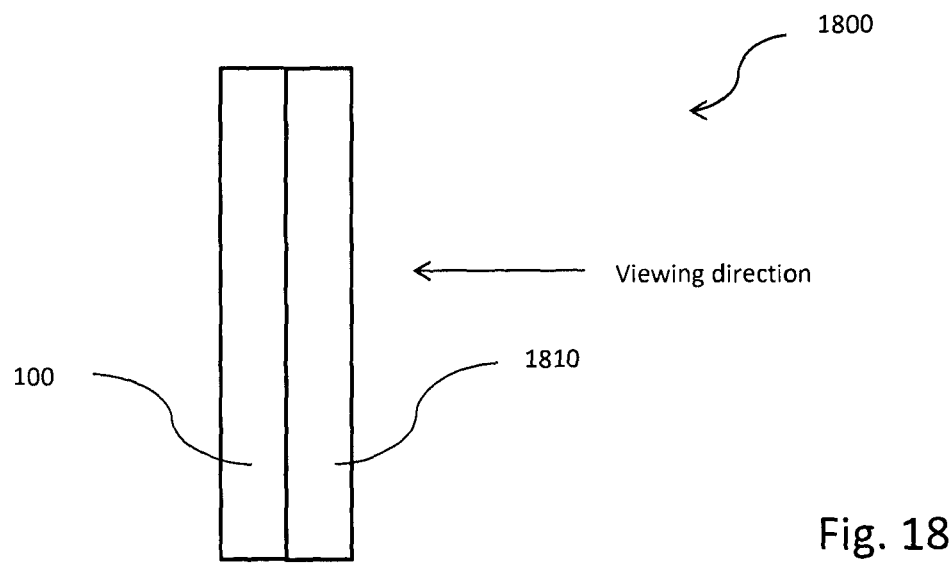
FIG. 18 is a cross-sectional view of a modified LCD panel according to an embodiment of the present disclosure.
Figure 19:
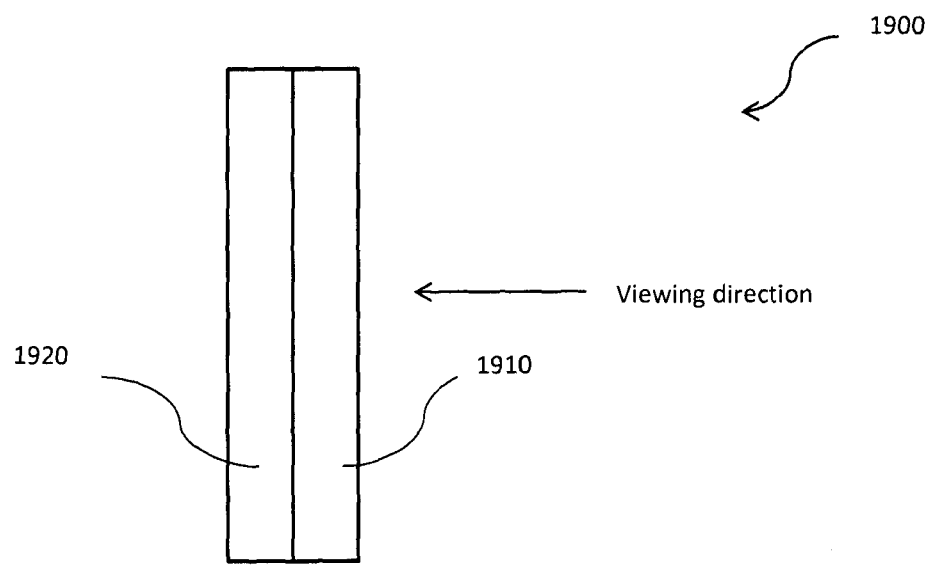
FIG. 19 is a cross-sectional view of a modified OLED panel according to an embodiment of the present disclosure.

LCMD film 100 or dark (e.g. color filtered) LCMD film 800, due to their switching and light diffusion functions, are also suitable for use in television (TV) monitors, computer monitors, or other type of monitor used for electronic visual displays. FIGS. 18 and 19 provide modified LCD and OLED panel embodiments for use in a variety of monitors or other uses. FIG. 18 provides a cross-sectional view of an LCD panel 1800 according to an embodiment of this disclosure. In this embodiment, an LCMD film 100 is coupled to a generally transparent LCD device 1810. In various embodiments, an open space or a transparent material may be located between the LCMD film 100 and the LCD panel 1810. The LCD panel 1810 may be without a traditional illumination source such as cold cathode fluorescent lamps (CCFL) backlighting. When positioned in a window opening, in front of a traditional building window, or near another source of natural or artificial light, the LCMD film 100, switched to an opaque state, diffuses the incoming natural or artificial light to provide a backlighting panel for the LCD panel 1810. In daylight conditions, the LCMD film 100, as a backlighting source utilizing natural light, provides energy cost savings as compared to traditional LCD backlighting sources. When the LCMD film 100 is switched to a clear state, the LCD panel 1800 becomes generally transparent. In this configuration, natural light passing through the clear LCMD film 100 illuminates the LCD panel 1800. In this transparent mode, LCD panel may be suitable for a variety of purposes including transparent "heads-up" displays which allow users to view displayed information while also viewing the surrounding environment. These transparent displays may be useful to provide a safer and more controllable work environment for a variety of workers including loading dock operators, air traffic control workers, airport ground crews, surgeons, pilots, flight operation officers, military troops, or other users that benefit from receiving data while maintaining awareness of the surrounding environment. Other applications for the LCD panel 1800 include use as a top or front panel for a sales cabinet. Installed lighting within the cabinet may be diffused by the LCMD film 100 to backlight the LCD panel 1810 and display images on the cabinet. With this embodiment, viewers may view advertising or instructions on the cabinet and see merchandise inside the cabinet.

FIG. 19 provides a cross-sectional view of an OLED panel 1900 according to an embodiment of this disclosure. In this embodiment, a switchable film 1920 is coupled to an OLED display 1910 (e.g. in film or in panel format). The switchable film 1920 may be, for example, an LCMD film 100, a dark (e.g. filtered) LCMD film 800, a dichroic LCMD, a dichroic NPD-LCD, a reverse mode dichroic NPD-LCD, or other devices with electrical switching function between transparent and non-transparent modes. Switchable film 1920 may be positive mode or negative mode. The switchable function of film 1920 allows the OLED panel 1900 to provide situation-specific visual effects and to provide versatility in various applications. The OLED panel 1900 may be flexible and thus able to wrap or generally conform to a variety of surfaces including planar surfaces, curved surfaces or irregular surface. Alternatively, the OLED panel may be mounted as a banner, flag, or other display with freedom of motion. The OLED display 1910 is self-illuminating and therefore may not require additional backlighting.

In one embodiment, the switchable film 1920 may be an LCMD film 100 having a transparent mode and an opaque mode. The OLED display 1910 may have a transparent mode and a non-transparent mode. In the non-transparent mode, the OLED display 1910 may be suitable for displaying images such as TV images or computer graphics. With the OLED display 1910 in transparent mode (and with the LCMD film 100 in transparent mode), the OLED panel 1900 is see-through. This see-through configuration may be suitable for commercial applications in which the consumer is invited to see through to displays or merchandise on an opposite side of the OLED panel 1900. However, this configuration may be generally unsuitable for watching TV or a graphical image on the OLED display 1910 because the background visible through the panel 1900 may act as noise information, distracting the viewer.

In another embodiment, the switchable film 1920 may be a darkened LCMD film 800. In an opaque state, the darkened LCMD film 800 provides a darkened, non-transparent background color for a non-transparent mode of OLED panel 1900. In this mode, the darkened LCMD film 800 blocks the view of distractions behind the OLED panel 1900. When the darkened LCMD film 800 is in a clear state, the OLED panel 1900 is in a transparent mode.

In another embodiment, the switchable film 1920 may be a dichroic (e.g., including dichroic dyes) LCMD film. Although a darkened LCMD film 800 and a dichroic LCMD film may have the same degree of darkness in opaque states, the dichroic LCMD film has a brighter clear state than the darkened LCMD film 800. This is because the darkness of darkened LCMD film 800 in a clear state is fixed, but the darkness of a dichroic LCMD film in a clear state is changeable. Thus, an OLED panel 1900 may have the brightest (i.e., least darkened) transparency, using a dichroic LCMD film as the film 1920.

With either darkened LCMD film 800 or dichroic LCMD film as the switchable film 1920, if a positive mode switchable film 1920 is used, a transparent OLED panel 1900 is achieved when both the OLED display 1910 and the switchable film 1920 are powered on. In this configuration, however, the OLED panel 1900 is not transparent when powered off because the switchable film 1920 becomes opaque. Often, users will prefer OLED panels 1900 to be transparent in both powered on and off states. To achieve this configuration, a reverse or negative mode switchable film 1920 is used so that when power to both the film 1920 and the OLED display 1910 is off, the switchable film 1920 and thus the OLED panel 1920 becomes transparent. In this transparent mode, the panel 1900 uses less energy because the clear state of reverse mode switchable film 1920 does not require energy. In this configuration, the OLED panel 1900 provides a fail-safe function suitable for use in moving vehicles like cars, ships, or airplanes. In this configuration, if the OLED display 1910 is powered on and the switchable film 1920 is powered off, the OLED panel 1900 is in a transparent mode. If the switchable film 1920 is powered on while the OLED display 1910 is powered on, the OLED panel 1900 is in a non-transparent mode.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A panel apparatus comprising:
   a first layer, wherein the first layer includes a liquid crystal microdroplet (LCMD) device switchable between transparent and opaque states in response to a change in an applied electrical voltage; and
   a second layer spaced apart from and coupled to the first layer, wherein the second layer includes a transparent panel.

2. The panel apparatus of claim 1 further comprising a spacer component coupled between the first and second layers.

3. The panel apparatus of claim 2 wherein the spacer component is a seal configured to prevent a gaseous fluid from migrating from between the first and second layers.

4. The panel apparatus of claim 3 wherein the gaseous fluid is air.

5. A panel apparatus comprising:
   a first layer, wherein the first layer includes a liquid crystal microdroplet (LCMD) device switchable between transparent and opaque states in response to a change in an applied electrical voltage; and
   a second layer spaced apart from and coupled to the first layer, wherein the second layer includes a transparent panel;
   a spacer component coupled between the first and second layers wherein the spacer component is a seal configured to prevent a gaseous fluid from migrating from between the first and second layers;
   wherein the seal extends around a periphery of the first layer.

6. The panel apparatus of claim 5 further comprising a plurality of spacer elements distributed between the first and second layers, within a boundary formed by the seal.

7. The panel apparatus of claim 1 wherein the LCMD device is an NPD-LCD display.

8. The panel apparatus of claim 1 wherein the first layer further includes a plastic film.

9. The panel apparatus of claim 1 wherein the first layer further includes a layer of indium tin oxide.

10. The panel apparatus of claim 1 wherein the first layer further includes a non-transparent and reflective metal coating.

11. The panel apparatus of claim 1 wherein the first layer further includes color filter fused to the LCMD device.

12. The panel apparatus of claim 1 further comprising a third layer spaced apart from and coupled to the first layer, wherein the third layer includes a transparent panel.

13. The panel apparatus of claim 1 wherein the transparent panel is formed of a silica-based glass.

14. The panel apparatus of claim 1 wherein the transparent panel is formed of a polymer material.

15. An optical apparatus comprising:
   a first layer, wherein the first layer includes a liquid crystal microdroplet display (LCMD) switchable between transparent and opaque states in response to a change in an applied electrical voltage; and
   a second layer coupled to the first layer, wherein the second layer includes a light absorbing dark film.

16. The optical apparatus of claim 15 further comprising a third layer spaced apart from and coupled to the first layer, wherein the third layer includes a transparent panel.

17. The optical apparatus of claim 15 wherein the LCMD device is an NPD-LCD display.

18. A film apparatus comprising:
   a first layer, wherein the first layer includes a liquid crystal microdroplet (LCMD) device switchable between transparent and opaque states in response to a change in an applied electrical voltage; and
   a second layer coupled to the first layer, wherein the second layer includes a light reflective coating.

19. The panel apparatus of claim 1 wherein the LCMD device or the transparent layer includes an anti-reflection or anti-glare coating.

20. The optical apparatus of claim 18 wherein the LCMD display is an NPD-LCD display.

* * * * *